US012203822B2

(12) United States Patent
Casu et al.

(10) Patent No.: US 12,203,822 B2
(45) Date of Patent: Jan. 21, 2025

(54) HETEROGENEOUS MAGNETIC AND INDUCTIVE SENSORS

(71) Applicant: Allegro MicroSystems, LLC, Manchester, NH (US)

(72) Inventors: Emanuele Andrea Casu, Annecy (FR); Yannick Vuillermet, La Motte Servolex (FR); Andreas P. Friedrich, Metz-Tessy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 345 days.

(21) Appl. No.: 17/659,224

(22) Filed: Apr. 14, 2022

(65) Prior Publication Data

US 2023/0332965 A1   Oct. 19, 2023

(51) Int. Cl.
| | |
|---|---|
| *G01L 3/10* | (2006.01) |
| *G01B 7/30* | (2006.01) |
| *G01D 3/08* | (2006.01) |
| *G01D 5/14* | (2006.01) |
| *G01D 5/20* | (2006.01) |
| *G01D 5/56* | (2006.01) |
| *G01L 3/14* | (2006.01) |

(52) U.S. Cl.
CPC ............... *G01L 3/105* (2013.01); *G01B 7/30* (2013.01); *G01D 3/08* (2013.01); *G01D 5/147* (2013.01); *G01D 5/204* (2013.01); *G01D 5/2046* (2013.01); *G01D 5/56* (2013.01); *G01L 3/1435* (2013.01)

(58) Field of Classification Search
CPC ..... G01D 5/14–147; G01D 5/20–2093; G01B 7/30–315; G01L 3/10–109
See application file for complete search history.

(56) References Cited

U.S. PATENT DOCUMENTS

| | | |
|---|---|---|
| 5,592,058 A | 1/1997 | Archer et al. |
| 6,373,307 B1 | 4/2002 | Takai |
| | (Continued) | |

FOREIGN PATENT DOCUMENTS

| | | |
|---|---|---|
| CN | 105634361 A | 6/2016 |
| DE | 102018220363 A1 * | 5/2020 |
| | (Continued) | |

OTHER PUBLICATIONS

U.S. Appl. No. 17/097,533, filed Nov. 13, 2020, Gillet, et al.
(Continued)

*Primary Examiner* — Judy Nguyen
*Assistant Examiner* — James Split
(74) *Attorney, Agent, or Firm* — DALY, CROWLEY, MOFFORD & DURKEE, LLP

(57) ABSTRACT

A heterogeneous sensor system includes a magnetic field sensor and an inductive sensor. A checker is configured to receive the magnetic field sensor output signal and the inductive sensor output signal and determine whether an error has occurred based on a comparison of the magnetic field sensor output signal and the inductive sensor output signal. Targets include at least a portion that is conductive and may include a ferromagnetic portion for back biased magnetic sensing. Additional features include on axis and off axis positioning of the sensors with respect to the target, multi-track targets for absolute position sensing, angle sensing and torque sensing configurations.

6 Claims, 12 Drawing Sheets

(56) References Cited

U.S. PATENT DOCUMENTS

| | | | |
|---|---|---|---|
| 6,828,783 B2* | 12/2004 | Schroter | G01D 5/2053 |
| | | | 324/207.17 |
| 7,772,838 B2 | 8/2010 | Bailey et al. | |
| 8,280,568 B2 | 10/2012 | Nakatsu et al. | |
| 8,453,518 B2 | 6/2013 | Diekmann et al. | |
| 8,917,043 B2 | 12/2014 | Reynolds et al. | |
| 8,917,044 B2 | 12/2014 | Reynolds et al. | |
| 9,194,884 B1 | 11/2015 | Mossman et al. | |
| 9,329,057 B2 | 5/2016 | Foletto et al. | |
| 9,411,023 B2 | 8/2016 | Friedrich et al. | |
| 9,780,706 B2 | 10/2017 | Allegrini et al. | |
| 9,983,045 B2 | 5/2018 | O'Neill | |
| 10,145,908 B2 | 12/2018 | David et al. | |
| 10,310,028 B2 | 6/2019 | Latham et al. | |
| 10,330,499 B2 | 6/2019 | Elliott et al. | |
| 10,380,879 B2 | 8/2019 | Haas et al. | |
| 10,564,007 B2* | 2/2020 | Maniouloux | G01D 5/2046 |
| 10,580,289 B2 | 3/2020 | Haas et al. | |
| 10,636,285 B2 | 4/2020 | Haas et al. | |
| 10,692,362 B2 | 6/2020 | Petrie et al. | |
| 10,705,560 B1 | 7/2020 | Petrie | |
| 10,802,133 B2* | 10/2020 | Hammerschmidt | G01S 11/12 |
| 10,816,366 B2 | 10/2020 | Weiland et al. | |
| 10,866,122 B2 | 12/2020 | Weiland et al. | |
| 10,996,289 B2 | 5/2021 | Latham et al. | |
| 11,079,291 B2 | 8/2021 | Bertin | |
| 11,112,275 B2 | 9/2021 | Bertin | |
| 11,303,257 B2 | 4/2022 | Daubert et al. | |
| 11,326,903 B1 | 5/2022 | Casu et al. | |
| 11,408,755 B2 | 8/2022 | Bertin | |
| 11,692,807 B2* | 7/2023 | Ausserlechner | G01D 5/145 |
| | | | 324/207.25 |
| 11,920,927 B2* | 3/2024 | Launay | G01D 5/145 |
| 2003/0001537 A1 | 1/2003 | Yang et al. | |
| 2003/0070126 A1 | 4/2003 | Werner et al. | |
| 2003/0127289 A1 | 7/2003 | Elgas et al. | |
| 2004/0232862 A1 | 11/2004 | Wogari et al. | |
| 2005/0007044 A1 | 1/2005 | Qiu et al. | |
| 2006/0195720 A1 | 8/2006 | Watts | |
| 2007/0001629 A1 | 1/2007 | McGarry et al. | |
| 2009/0254300 A1 | 10/2009 | Schneider et al. | |
| 2009/0315544 A1 | 12/2009 | Takahashi et al. | |
| 2011/0062909 A1 | 3/2011 | Patel et al. | |
| 2012/0074972 A1 | 3/2012 | Rasbornig et al. | |
| 2012/0211299 A1 | 8/2012 | Yanai | |
| 2013/0106340 A1 | 5/2013 | Chabaud et al. | |
| 2013/0154538 A1 | 6/2013 | Ogawa | |
| 2013/0200909 A1 | 8/2013 | Rasbornig et al. | |
| 2013/0249544 A1 | 9/2013 | Vig et al. | |
| 2014/0028237 A1 | 1/2014 | Park et al. | |
| 2014/0184200 A1 | 7/2014 | Milano et al. | |
| 2014/0285124 A1 | 9/2014 | Derammelaere et al. | |
| 2014/0333241 A1 | 11/2014 | Zhao et al. | |
| 2015/0015241 A1 | 1/2015 | Tamura | |
| 2015/0185279 A1 | 7/2015 | Milano et al. | |
| 2015/0185284 A1 | 7/2015 | Milano et al. | |
| 2015/0185293 A1 | 7/2015 | Milano et al. | |
| 2015/0241523 A1 | 8/2015 | Scherr | |
| 2015/0354985 A1 | 12/2015 | Judkins, III et al. | |
| 2016/0025820 A1 | 1/2016 | Scheller et al. | |
| 2016/0139199 A1 | 5/2016 | Petrie et al. | |
| 2016/0139229 A1 | 5/2016 | Petrie et al. | |
| 2017/0052208 A1 | 2/2017 | Reddy et al. | |
| 2017/0110652 A1 | 4/2017 | Doogue et al. | |
| 2017/0346420 A1 | 11/2017 | Ross et al. | |
| 2018/0138841 A1 | 5/2018 | Campbell et al. | |
| 2018/0214509 A1 | 8/2018 | Desriac et al. | |
| 2018/0367073 A1 | 12/2018 | Haas | |
| 2021/0148734 A1 | 5/2021 | Foletto | |
| 2022/0003572 A1 | 1/2022 | Stewart | |
| 2022/0128382 A1 | 4/2022 | Drouin | |
| 2023/0160722 A1* | 5/2023 | Brajon | G01D 5/24438 |
| | | | 324/202 |
| 2023/0417579 A1 | 12/2023 | Latham et al. | |

FOREIGN PATENT DOCUMENTS

| | | |
|---|---|---|
| EP | 0 848 489 A2 | 6/1998 |
| JP | H 03231317 A | 10/1991 |
| JP | 2006/067667 A | 3/2006 |
| JP | 2010/045914 A | 2/2010 |
| KR | 101394556 B1 | 5/2014 |

OTHER PUBLICATIONS

U.S. Appl. No. 17/120,395, filed Dec. 14, 2020, Casu, et al.
U.S. Appl. No. 17/651,265, filed Feb. 16, 2022, Ostermann, et al.
Allegro MicroSystems datasheet ATS696PSM, "Position Sensor IC with Speed and Direction Output", Oct. 7, 2021, 14 pages.
Emadi, McMaster University "Advanced Electric Drive Vehicles", 2015, 3 pages.
International Standard ISO 26262-1 "Road Vehicles—Functional Safety—Part 1 Vocabulary", Nov. 15, 2011, 30 pages.
International Standard ISO 26262-5 "Road Vehicles—Functional Safety—Part 5 Product development at the hardware level", Nov. 15, 2011, 86 pages.
International Standard ISO 26262-9 "Road Vehicles—Functional Safety—Part 9 Automotive Safety Integrity Level (ASIL)-oriented and safety-oriented analyses", Nov. 15, 2011, 24 pages.
Microchip WebSeminars "Sensorless Field Oriented Control (FOC) for Permanent Magnet Synchronous Motors (PMSM)", 51 pages.
Restriction Requirement dated Apr. 6, 2018 for U.S. Appl. No. 15/622,459, 5 pages.
Response to Restriction Requirement and Preliminary Amendment filed Jun. 1, 2018 for U.S. Appl. No. 15/622,459, 10 pages.
Office Action dated Sep. 17, 2018 for U.S. Appl. No. 15/622,459, 11 pages.
Response to Office Action filed Dec. 10, 2018 for U.S. Appl. No. 15/622,459, 14 pages.
Notice of Allowance dated Mar. 18, 2019 for U.S. Appl. No. 15/622,459; 10 pages.
Extended European Search Report dated Oct. 4, 2018 for European Application No. 18176741.9; 7 Pages.
Response to Office Action filed Jun. 27, 2019 for European Application No. 18176741.9; 68 pages.
Intention of Grant dated Aug. 27, 2020 for for European Application No. 18176741.9; 2 pages.
Preliminary Amendment filed Sep. 10, 2019 for U.S. Appl. No. 16/444,347; 9 pages.
Office Action dated Oct. 10, 2019 for U.S. Appl. No. 16/444,347; 6 pages.
Response to Office Action filed Dec. 11, 2019 for U.S. Appl. No. 16/444,347; 10 pages.
Terminal Disclaimer filed Dec. 10, 2019 for U.S. Appl. No. 16/444,347; 3 pages.
Notice of Allowance dated Jan. 13, 2020 for U.S. Appl. No. 16/444,347; 8 pages.
Office Action dated Mar. 8, 2019 for U.S. Appl. No. 15/697,846; 19 Pages.
Response to Office Action dated Mar. 8, 2019 filed Jun. 6, 2019 for U.S. Appl. No. 15/697,846; 13 Pages.
Final Office Action dated Jun. 27, 2019, for U.S. Appl. No. 15/697,846; 18 pages.
Response to Final Office Action dated Jun. 27, 2019, filed Sep. 6, 2019, for U.S. Appl. No. 15/697,846; 15 pages.
Office Action dated Oct. 2, 2019 for U.S. Appl. No. 15/697,846; 20 Pages.
Response to Office Action dated Oct. 2, 2019 filed Jan. 27, 2020 for U.S. Appl. No. 15/697,846; 14 Pages.
Final Office Action dated Apr. 14, 2020, for U.S. Appl. No. 15/697,846; 21 pages.
Extended European Search Report dated Jan. 23, 2019 for European Application No. 18192781.5; 8 Pages.
Response to Office Action filed Sep. 13, 2019 for European Application No. 18192781.5; 18 pages.
U.S. Appl. No. 18/354,895, filed Jul. 19, 2023, Richards, et al.
U.S. Appl. No. 18/354,903, filed Jul. 19, 2023, Lassalle-Balier, et al.
U.S. Appl. No. 18/362,357, filed Jul. 31, 2023, Ali, et al.

(56) References Cited

OTHER PUBLICATIONS

U.S. Appl. No. 18/394,642, filed Dec. 22, 2023, Casu, et al.
U.S. Appl. No. 18/475,674, filed Sep. 27, 2023, Casu, et al.
U.S. Appl. No. 18/654,582, filed May 3, 2024, Vuillermet, et al.

* cited by examiner

HETEROGENEOUS MAGNETIC AND INDUCTIVE SENSORS

FIELD

This disclosure relates generally to heterogeneous sensors and, more particularly to heterogeneous sensors incorporating magnetic and inductive sensors.

BACKGROUND

As is known, sensors are used to perform various functions in a variety of applications. Some sensors include one or magnetic field sensing elements, such as Hall effect elements or magnetoresistive elements, to sense a magnetic field associated with proximity or motion of a target object, such as a ring magnet or a ferromagnetic object in the form gear, or to sense a current, as examples. Some sensors are inductive sensors that include a primary or transmitting coil that generates a biasing field in response to an oscillation signal and one or more secondary, or receiving coils electromagnetically coupled to the primary coil for generating one or more secondary signals. The secondary signal can be processed to detect a position of a target arranged such that the coupling between the primary and secondary coils is a function of the target position. For example, the target can be a core around which the primary and secondary coils are wound. In general, the target position information is amplitude modulated in the secondary signal that can be demodulated synchronously with respect to the primary oscillation in order to extract target position information. In one example configuration, two secondary coils are arranged to generate respective secondary signals that contain amplitude modulated sine and cosine information that can be processed to determine target angle.

Sensors are often provided in the form of integrated circuits (IC) containing one or more semiconductor die supporting sensing elements, electronic circuitry and optionally also containing additional elements, such as a magnet and/or passive components, such as capacitors, inductors, or resistors.

Sensor integrated circuits are widely used in automobile control systems and other safety critical applications. There are a variety of specifications that set forth requirements related to permissible sensor quality levels, failure rates, and overall functional safety. One approach to meeting such mandates has been to use redundant, identical circuits in a sensor IC.

SUMMARY

Described herein are heterogeneous sensors including inductive and magnetic sensors in various configurations, including different positioning of components and circuit board configurations. Checking circuits and techniques for comparing the heterogeneous sensor outputs are implemented to meet a high level of safety compliance requirements. At least a portion the described targets is conductive. Targets may include a ferromagnetic portion for back biased magnetic sensing. Additional features include on axis and off axis positioning of the sensors with respect to a rotating target, multi-track targets for absolute position sensing, angle sensing and torque sensing configurations.

According to the disclosure, an angle sensor system configured to sense an angle of a rotatable target includes a magnetic field sensor and an inductive sensor. The magnetic field sensor includes a magnetic field sensing element responsive to a magnetic field affected by movement of the target and configured to generate a magnetic field sensor output signal indicative of an angle of the target. The inductive sensor includes an oscillator configured to generate an oscillation signal, a primary coil coupled to receive the oscillation signal, and one or more secondary coils electromagnetically coupled to the primary coil as a function of the angle of the target, wherein the inductive sensor is configured to generate an inductive sensor output signal indicative of the angle of the target. A checker is configured to receive the magnetic field sensor output signal and the inductive sensor output signal and determine whether an error has occurred based on a comparison of the magnetic field sensor output signal and the inductive sensor output signal.

Features may include one or more of the following individually or in combination with other features. The target can include a conductive material. The target may further include a ferromagnetic material and the magnetic field sensor can further include a back bias magnet configured to generate the magnetic field. The target can have an outer radius and an inner radius and a plurality of features extending from the outer radius to the inner radius in a target plane that is orthogonal with respect to the axis of rotation. The magnetic field sensor and the inductive sensor can be positioned between the outer radius and the inner radius of the target in a sensing plane that is substantially parallel with respect to target plane. In embodiments, the magnetic field sensor and the inductive sensor can be positioned adjacent to each other in a circumferential direction with respect to the target axis of rotation.

The angle sensor can further include an interface IC configured to support circuitry to generate the inductive sensor output signal and a printed circuit board configured to support the magnetic field sensor, the inductive sensor, and the interface IC. In embodiments, the magnetic field sensor and the inductive sensor can be positioned adjacent to each other in a radial direction. In embodiments, the outer radius is coincident with an outer radius of the target and the magnetic field sensor and the inductive sensor are positioned in a sensing plane that is substantially tangential with respect to the outer radius of the target. The angle sensor system can further include a flexible, curved printed circuit board configured to support the inductive sensor.

In embodiments, the target has a first portion including the conductive material for sensing by the one or more secondary coils of the inductive sensor and a second portion including magnetized features configured to generate the magnetic field. The first portion of the target and the second portion of the target can be positioned adjacent to each other in a radial direction and in a target plane that is orthogonal with respect to the axis of rotation, wherein the magnetic field sensor and the inductive sensor are positioned in a sensing plane that is substantially parallel with respect to target plane with the inductive sensor positioned proximate to the first portion of the target and the magnetic field sensor positioned proximate to the second portion of the target. The first portion of the target and the second portion of the target can be positioned adjacent to each other in an axial direction that is parallel with respect to the axis of rotation, wherein the magnetic field sensor and the inductive sensor are positioned adjacent to each other in a circumferential direction with respect to the target axis of rotation.

In embodiments, the target has an outer radius, an intermediate radius, and an inner radius, and wherein the target further has a first plurality of features extending from the outer radius to the intermediate radius and a second plurality of features extending from the intermediate radius to the inner radius, and wherein the first plurality of features and the second plurality of features are positioned in a target plane that is orthogonal with respect to the axis of rotation. The magnetic field sensor can include a first magnetic field sensor adjacent to the first plurality of features and a second magnetic field sensor adjacent to the second plurality of features, and wherein the inductive sensor includes a first inductive sensor adjacent to the first plurality of features and a second inductive sensor adjacent to the second plurality of features, wherein the magnetic field sensor and the inductive sensor are positioned in a sensing plane that is substantially parallel with respect to the target plane. The target can further include a ferromagnetic material and wherein the first magnetic field sensor includes a first back bias magnet and the second magnetic field sensor includes a second back bias magnet. The target can have a first portion including the conductive material for sensing by the inductive sensor and a second portion including magnetized features configured to generate the magnetic field.

Also described is a method for sensing an angle of a rotatable target including generating a magnetic field sensor output signal with a magnetic field sensor including a magnetic field sensing element responsive to a magnetic field affected by movement of the target and generating an inductive sensor output signal with an inductive sensor including an oscillator configured to generate an oscillation signal, a primary coil coupled to receive the oscillation signal, and one or more secondary coils electromagnetically coupled to the primary coil as a function of the angle of the target. The method further includes comparing the magnetic field sensor output signal to the inductive sensor output signal to determine whether an error has occurred based whether a result of the comparison is within a predetermined range.

According to a further aspect of the disclosure, a torque sensing system includes a first target having a plurality of features and configured for coupling to a first rotatable shaft, a second target having a plurality of features and configured for coupling to a second rotatable shaft, wherein the first rotatable shaft is coupled to the second rotatable shaft by an elastic member, and a magnetic field sensor package positioned between the first target and the second target. The magnetic field sensor package includes a first magnetic field sensor positioned proximate to the first target and configured to generate a first magnetic field output signal indicative of an angle of the first target, a second magnetic field sensor positioned proximate to the second target and configured to generate a second magnetic field output signal indicative of an angle of the second target, and a back bias magnet positioned between the first magnetic field sensor and the second magnetic field sensor and configured to generate a magnetic field that is affected by rotation of the first target and the second target. A processing unit coupled to receive the first and second magnetic field output signals is configured to determine a difference between the angle of the first target and the angle of the second target based on the first and second magnetic field output signals, wherein the unit is further configured to calculate, based on the difference, a first torque applied to the first or second rotatable shaft.

Features may include one or more of the following individually or in combination with other features. The torque sensing system can further include a printed circuit board having an aperture in which the magnetic field sensor package is positioned. The torque sensing system can further include a first inductive sensor proximate to the first target and configured to generate a first inductive sensor output signal indicative of the angle of the first target and a second inductive sensor proximate to the second target and configured to generate a second inductive sensor output signal indicative of the angle of the second target, wherein the processing unit is further coupled to receive the first and second inductive sensor output signals and configured to determine a difference between the angle of the first target and the angle of the second target based on the first and second inductive sensor output signals, wherein the unit is further configured to calculate, based on the difference, a second torque applied to the first or second rotatable shaft. The torque sensing system can further include a checker configured to determine whether an error has occurred based on a comparison of the first torque and the second torque.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
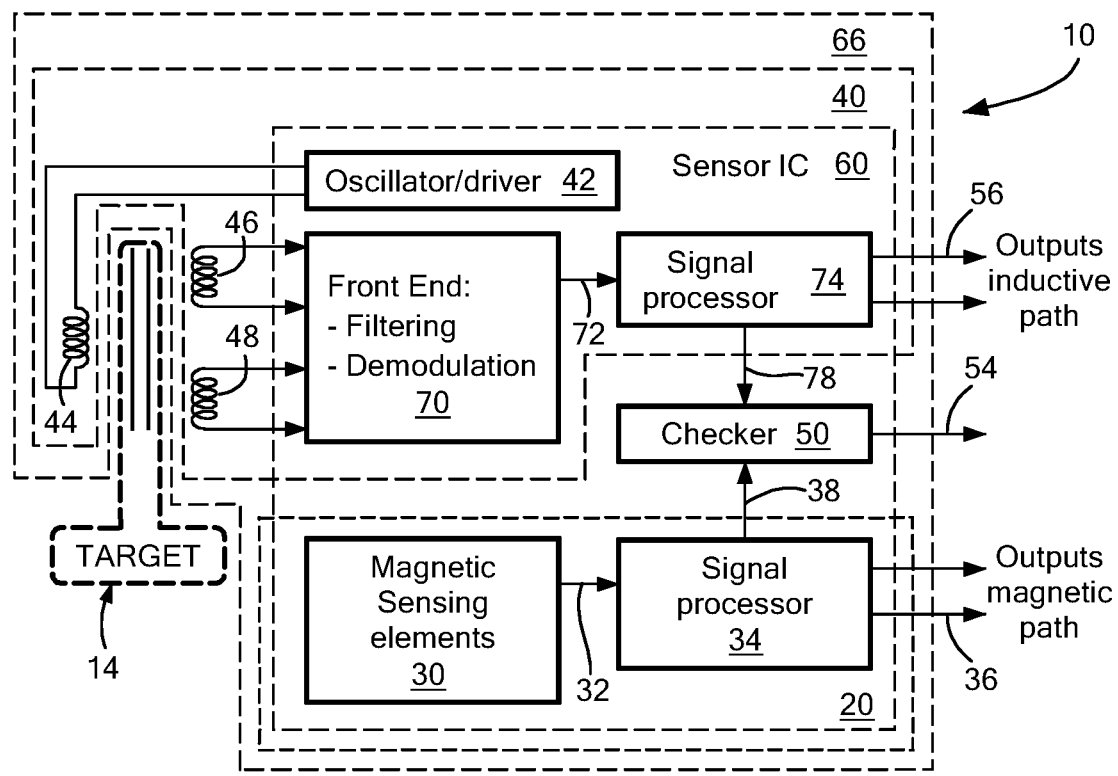
FIG. 1 is a block diagram of a heterogeneous sensing system incorporating magnetic field sensing and inductive sensing according to the disclosure.

Referring to FIG. 1, a heterogeneous sensor system 10 for sensing a target 14 includes a magnetic field sensor 20 and an inductive sensor 40. The magnetic field sensor (or simply magnetic sensor) 20 includes one or more magnetic field sensing elements 30 responsive to a magnetic field affected by the target 14 and configured to generate one or more magnetic field sensor output signals 36 indicative of a position and/or motion of the target, such as target angle in an example embodiment.

The inductive sensor 40 includes an oscillator with a driver 42 configured to generate an oscillation signal, a primary coil 44 coupled to receive the oscillation signal, and one or more secondary coils (here two secondary coils 46, 48) electromagnetically coupled to the primary coil as a function of the position (e.g., angle) of the target 14. In other words, secondary coils 46, 48 as can be referred to as pick-up coils, are electromagnetically coupled to the primary coil 44 and mechanically coupled to target 14 such that movement of the target causes position information to be encoded in secondary signals from coils 46, 48 by amplitude modulation. The inductive sensor 40 is configured to generate one or more inductive sensor output signals 56 indicative of a position and/or motion of the target, such as target angle in the example embodiment. Elements of the inductive sensor 40 other than the transmit and receive coils 44, 46, and 48 can be referred to as inductive interface circuitry.

More particularly, primary coil 44 induces eddy currents in the target 14, which eddy currents in turn induce a signal in the secondary coils 46, 48. As the target 14 moves (e.g., rotates), coupling between the primary winding 44 and the secondary windings 46, 48 changes, so as to thereby encode target position information by way of amplitude modulation of the secondary signals generated in the secondary windings 46, 48. It will be appreciated that various mechanical configurations for the target 14 and primary and secondary coils 44, 46, 48 are possible.

A checker circuit or simply checker 50 is configured to receive one or more signals 38 based on magnetic field signal processing from a signal processor 34 and one or more signals 78 based on inductive signal processing from a signal processor 74 and determine whether a fault or error has occurred based on a comparison of the received signals. The received signals 38, 78 can be intermediate signals (e.g., angle values calculated by respective signal processors 34, 74) and/or can be the magnetic field sensor output signals 36 and the inductive sensor output signals 56 that have been formatted in a desired protocol for communication to external circuits and systems. For simplicity of explanation, signals 38, 78, like respective signals 36, 56, can be referred to as magnetic field sensor output signals and inductive sensor output signals, respectively; however, it will be appreciated by those of ordinary skill in the art that such signals 38, 78 can be identical to the formatted sensor output signals 36, 56 or can represent information that has not been put into a particular output protocol format (e.g., SPI, PWM, SENT, etc.).

A high level of safety standard compliance can be achieved by using two unique (i.e., heterogeneous) sensors 20, 40 and a checker circuit 50 to compare signals 38, 78 from the two sensors in order to thereby implement heterogeneous redundancy. In the context of the disclosure, heterogeneous sensors 20, 40 differ from each other in sensing methodology; namely, magnetic field sensor 20 senses a magnetic field affected by target movement and/or position and inductive sensor 40 senses signals that are amplitude modulated based on target movement and/or position.

Heterogeneous magnetic field and inductive sensors 20, 40 are described herein in the context of angle sensing system 10 with which an angle of the target 14 is sensed. However, it will be appreciated by those of ordinary skill in the art that the described heterogeneous sensing methodologies and the advantages of incorporating such heterogeneous sensing in a single sensor system are applicable to other sensing applications. For example, in addition to or instead of angle sensing, other target parameters that can be sensed include, but are not limited to target speed and/or direction of motion. Further, other sensing applications for the described heterogeneous sensor systems include a magnetic sensor that senses position or proximity of a target, a movement detector or sensor such as a rotation detector or linear movement position sensor, a magnetic field sensor that senses a magnetic field density, and/or the magnetic field direction of a magnetic field.

The magnetic field sensor 20 and the inductive sensor 40 can be implemented in a single package assembly or package 66 or in multiple packages. Such a single package assembly 66 can include a single printed circuit board (PCB) for supporting elements of the system 10 other than the target 14 or can include multiple PCBs. In other implementations, the magnetic field sensor 20 and interface circuitry of the inductive sensor 40 (i.e., the portion of the inductive sensor 40 other than the transmit and receive coils 44, 46, and 48) can be implemented in the form of one or more integrated circuits (IC s) including one or more semiconductor die or other substrates in one or more packages. The example sensor system 10 illustrates both the magnetic field sensor 20 and the inductive sensor interface circuitry integrated in a single IC 60. It will be understood that the present disclosure is not limited to any specific integration of the magnetic field sensor 20 and inductive sensor 40.

Target 14 can take various forms suitable for inductive and magnetic field sensing. In the context of the example angle sensing embodiment, target 14 can be rotatable about an axis of rotation. For example, target 14 can take the form of a gear fixedly coupled to a rotating shaft.

In some embodiments, the same conductive target or target portion can be sensed by both the magnetic field sensor 20 and the inductive sensor 40 (e.g., FIGS. 3, 3A, 4, 4A, 4B, 4C, and 5, 6 and 7). In some embodiments, target 14 can have different portions (or can include more than one target) independently optimized for sensing by magnetic field sensor 20 and inductive sensor 40 (e.g., FIGS. 8, 9, 9A, 10, 10A).

In general, target 14 includes at least a portion comprised of a conductive material to enable inductive sensing. For this purpose, the conductive material of target 14 can be selected from a variety of materials, including but not limited to aluminum, copper, and steel and can be ferromagnetic or non-ferromagnetic.

In embodiments in which the same target or target portion is designed for sensing by both the magnetic field sensor 20 and the inductive sensor 40, the conductive material of the target is ferromagnetic to enable magnetic field sensing by sensor 20 (e.g., FIGS. 3, 3A, 4, 4A, 4B, 4C, 5, 6 and 7).

In embodiments in which the target includes different portions optimized for sensing by the magnetic field sensor 20 and the inductive sensor 40, the conductive material of the target 14 can be optimized for inductive sensing in which case the material can be non-ferromagnetic with a high conductivity to provide a larger signal, thereby permitting a larger airgap and better resolution for inductive sensing (e.g., FIGS. 8, 9, 9A, 10, 10A). Although aluminum and copper are electrically well-suited for inductive sensing, steel can be more advantageous due to its more suitable mechanical properties such as hardness and strength.

In embodiments with different target portions or targets optimized for sensing by the magnetic field sensor 20 and the inductive sensor 40, the target portion optimized for magnetic field sensing can be selected based on whether or not the magnetic field sensor 20 operates in a back bias fashion (i.e., with a proximate back bias magnet configured to generate the magnetic field that is affected by target movement). In such back bias embodiments, the target portion optimized for magnetic field sensing is ferromagnetic, preferably with a relative permeability greater than 10. Alternatively, the target portion optimized for magnetic field sensing can take the form of a ring magnet having alternating magnetic domains (i.e., pole pairs) with which the magnetic field is generated without a back bias magnet, in which case the sensing target portion can be ferromagnetic or non-ferromagnetic.

Magnetic field sensing elements 30 generate magnetic field signals indicative of a sensed magnetic field associated with the target 14. Magnetic field sensing elements 30 can take the form of various transducer types configured to generate magnetic field signals 32 indicative of the sensed magnetic field. As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall effect elements tend to have axes of maximum sensitivity perpendicular to a substrate, while metal based or metallic magnetoresistance elements (e.g., GMR, TMR, AMR) and vertical Hall effect elements tend to have axes of maximum sensitivity parallel to a substrate.

As used herein, the term "magnetic field signal" is used to describe any signal that results from a magnetic field experienced by a magnetic field sensing element.

In an example angle sensor, magnetic field sensing elements 30 include at least two elements, each of which generates a magnetic field signal 32 indicative of a sensed magnetic field affected by target 14. The magnetic field signals 32 and their respective processing paths can be referred to as "channels." In some embodiments, signals 32 include at least two signals that are orthogonal to one another, or in quadrature (i.e., a sinusoidal signal and a cosinusoidal signal) as can be useful in angle and direction detection. Generating such quadrature channel signals 32 can be accomplished by adjusting features of the target 14, the positioning of the sensor IC 60 with respect to the target, the airgap between the target and the IC and/or the distance between sensing elements 30. In some embodiments, sensing elements 30 can include fewer than two sensing elements or can include three or more sensing elements. In the case of three or more sensing elements 30, the magnetic field sensor 20 can include three channels that are 60° phase shifted sinusoidal signals and the target angle can be derived from these three signals. It will be understood that the present disclosure is not limited to any specific number of magnetic field sensing elements 30.

A signal processor 34 can operate on one or more magnetic field signals 32 in order to generate one or more magnetic field sensor output signals 36. The magnetic field sensor output signals 36 can be indicative of speed, direction, and/or angle associated with the target 14 in example embodiments. For example, processor 34 can perform a speed calculation whereby a speed of motion (e.g., rotation) of the target 14 can be determined by comparing one or more magnetic field signals 32 to a threshold signal.

Direction calculation can be performed in various ways. For example, a direction of rotation of the target 14 can be determined by the phase relationship between magnetic field channel signals 32, whereby a first direction of rotation can correspond to a first channel signal leading a second channel signal and a second, opposite direction of rotation can correspond to the first channel signal lagging the second channel signal. It will be understood that the present disclosure is not limited to any specific methodology for target speed and/or direction calculation.

An angular position of target 14 also can be determined in various ways, for example, by performing CORDIC processing on signals 32. It will be understood that the present disclosure is not limited to any specific methodology for angle calculation.

Processor 34 can operate in the digital domain to generate magnetic field sensor output signals 36 for coupling to circuits and systems external to the IC 60 in order to thereby provide an indication of the sensed target parameter. Additional processing can be implemented by processor 34 including, but not limited to, gain and offset correction and/or harmonic correction as examples.

Magnetic field sensor output signals 36 can have a variety of formats to suit a particular application. For example, output signals 36 can be provided as quadrature differential analog signals (SINP, SINN, COSP, COSN) or an angle position signal provided in a Serial Peripheral Interface (SPI) format. The output signal format can be selected based on user-programmable parameters stored in EEPROM. It will be appreciated that other output signal information such as speed and direction and other output signal formats are possible, including but not limited to Pulse Width Modulation (PWM) format, Single Edge Nibble Transmission (SENT) format, Local Interconnect Network (LIN) format, CAN (Controller Area Network) format, and/or an Inter-Integrated Circuit (I2C) format to name a few. In some implementations, target speed, angle and/or direction computations are implemented by other circuits and systems (not shown) external to the IC 60.

As used herein, the term "processor" or "controller" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

Referring to the inductive sensor 40, secondary windings 46, 48 can be designed to have a predetermined phase relationship with respect to each other in order to suit a particular application. In the example angle sensor embodiment, secondary windings 46, 48 can be designed to generate respective secondary signals in quadrature (i.e., having a nominal ninety-degree phase shift with respect to each other).

A front end processor 70 can be coupled to secondary windings 46, 48 to process the received amplitude modulated signals. Example processing can include filtering such as EMI filtering and/or filtering by which analog signals from the secondary windings 46, 48 are converted into digital signals (e.g., sigma delta filtering). Processor 70 also implements demodulation to generate demodulated position signals 72 indicative of the position of the target 14.

A further signal processor 74 of the inductive sensor 40 can operate in the digital domain and implement signal processing functionality such as gain and offset correction and/or harmonic correction. Processor 74 can also operate on the demodulated position signals 72 to compute target speed, angle and/or direction for example, and can do so with the same or different methodologies as described above in connection with signal processor 34.

Processor 74 can generate one or more output signals 56 for communication to circuits and systems external to the IC 60 in order to thereby provide an indication of the sensed target parameter. More particularly, like the magnetic field sensor output signals 36, inductive sensor output signals 56 can have a variety of formats to suit a particular application. For example, output signals 56 can be provided as quadrature differential analog signals (SINP, SINN, COSP, COSN) or an angle position signal provided in a Serial Peripheral Interface (SPI) format. The output signal format can be selected based on user-programmable parameters stored in EEPROM. It will be appreciated that other output signal information such as speed and direction and other output signal formats are possible, including but not limited to Pulse Width Modulation (PWM) format, Single Edge Nibble Transmission (SENT) format, Local Interconnect Network (LIN) format, CAN (Controller Area Network) format, and/or an Inter-Integrated Circuit (I2C) format to name a few. In some implementations, target speed, angle and/or direction computations are implemented by other circuits and systems (not shown) external to the IC 60.

Checker 50 is configured to receive one or more signals 38 from magnetic field signal processor 34 and one or more signals 78 from inductive signal processor 74 and determine whether a fault or error has occurred based on a comparison of the received signals. For example, signal 38 can represent angle information calculated based on magnetic field sensing and signal 78 can represent angle information calculated based on inductive sensing and the signals 38, 78 can be compared by checker 50. If the difference between the signals 38, 78 is greater than a predetermined threshold, which threshold value depends on application specific safety limits, the checker 50 can signal a fault to an external system. Checking by checker 50 based on signals 38, 78 that represent angle information (e.g., as opposed to checking based on formatted output signals 36, 56 of a particular protocol) leaves more flexibility in having different type of output protocols (e.g., analog, SPI, PWM, SENT, etc.). An error can correspond to a result of the comparison being outside of a predetermined range.

Checker 50 may provide an error, or fault signal 54 for coupling to external circuits and systems for further processing or action. In some embodiments, the fault signal 54 is combined with the magnetic field sensor output signals 36 and/or with the inductive sensor output signals 56 in order to provide "composite" output signals that not only convey information about the target parameter sensed by the sensor IC 60, but also fault information as well.

Various techniques and/or circuitry can be used to implement checker 50. In some embodiments, checker 50 can function to sample one or more magnetic field sensor signals 38 and one or more inductive sensor output signals 78 and can include a synchronizer and a window comparator. For example, the synchronizer can provide a clock signal to the sample circuits to synchronize sampling and the synchronized, sampled signals can be coupled to inputs of the window comparator. The clock signal can also be coupled to the window comparator to control the time of comparison of the sampled signals. If implemented in the analog domain, sampling can be achieved with sample and hold circuits including a switch and capacitor whereby charge from the respective input signal is selectively stored on the capacitor when the switch is closed and held on the capacitor when the switch is open. In embodiments in which the checker 50 is implemented in the digital domain, sampling can be accomplished with digital registers or other suitable digital storage.

The window comparator can compare the sampled signals and generate fault signal 54 to indicate a fault if the sampled signals differ by more than a predetermined amount. In this configuration, one of the sampled signals provides the comparator threshold voltage and the other sampled signal provides the comparator input. The checker output signal 54 can be provided in a first logic state when the difference between the first and second sampled signals is less than a predetermined amount, as may be established by a resistor divider within the window comparator, and in a second logic state when the difference between the first and second sampled signals is greater than the predetermined amount.

In embodiments, the predetermined amount may be specified in terms of an absolute acceptable variation between the magnetic and inductive sensor outputs (e.g., in an angle sensor, the predetermined amount may correspond to a magnetic field angle error of 10°). In some embodiments, the predetermined amount can be a percentage difference (e.g., in an angle sensor, the predetermined amount can correspond to the sensor output being within 5% of the actual magnetic field angle). The predetermined amount can also be a programmable or selectable value.

The fault signal 54 can take various forms, such as a logic signal having a level depending on the difference between the first and second sampled signals, or a flag that is set when the difference between the sampled signals is greater than a predetermined amount and that is not cleared until some system function occurs or until cleared by a system processor, for example.

In an alternative checker configuration, checker 50 can include a delay element in series with one or both of the sample circuits and a window comparator. The delay element can delay signals 38, 78 before or after sampling in order to thereby ensure synchronization of the compared signals.

As used herein, the term "predetermined," when referring to a value or signal, is used to refer to a value or signal that is set, or fixed, in the factory at the time of manufacture, or by external means.

It should be understood that a so-called comparator can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

While circuitry shown in figures herein may be described and/or shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

Figure 2:
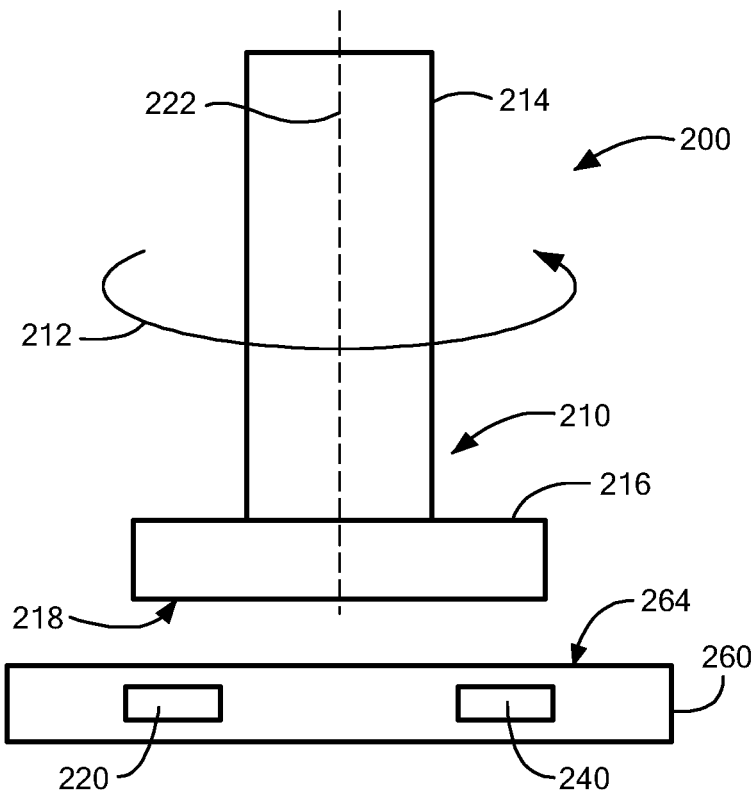
FIG. 2 illustrates a "on axis" configuration of the sensor of FIG. 1.

Referring also to FIG. 2, a sensor system 200 illustrates an example "on axis" or "end of shaft" configuration of a heterogeneous sensor 260 positioned proximate to a rotatable target 210. Sensor 260 can be the same as or similar to sensor 66 of FIG. 1 and thus, can include a magnetic field sensor 220 having magnetic field sensing elements and an inductive sensor 240 having a primary coil and two or more secondary coils. Target 210 can be the same as or similar to target 14 of FIG. 1 and thus, can include at least a portion that is conductive for sensing by inductive sensor 240.

In some implementations, target 210 is rotatable about an axis of rotation 222 as illustrated by arrow 212. Example target 210 can include a rotatable shaft 214 having a gear or other element 216 fixedly coupled to the shaft and including features for sensing by sensors 220, 240. Example target features include cut outs (e.g., FIG. 3) and/or teeth separated by slots or "valleys" (e.g., FIG. 3A).

Target 210 can have a target plane 218 in which the target features are located for sensing by sensor 260. By "on axis" it is meant that the sensor 260 has a major surface supporting magnetic field sensing elements (e.g., sensing elements 30 of FIG. 1) in a sensing plane 264 that is substantially parallel with respect to the target plane 218.

In embodiments in which the same target is used for both magnetic and inductive sensing, target 210 can be comprised of a conductive ferromagnetic material and, in use, a back bias magnet (not shown) can be positioned proximate to the target and sensor 260 to generate a magnetic field affected by movement of the target for sensing by the magnetic field sensor 220. Elements of system 200 are not sized to scale, but are illustrative only of the relative placement of the sensor 260 and target 210.

In embodiments in which different targets or target portions are used for magnetic and inductive sensing, only the portion of target element 216 that is sensed by the inductive sensor 240 need be conductive and can be non-ferromagnetic.

The primary coil associated of the inductive sensor 240 can be positioned so that the primary coil generates a magnetic field that induces eddy currents in the conductive portion of target element 216. The secondary coils of the inductive sensor 240 can be positioned so that the magnetic field generated by the eddy currents is sensed by the secondary coils.

Figure 3A:
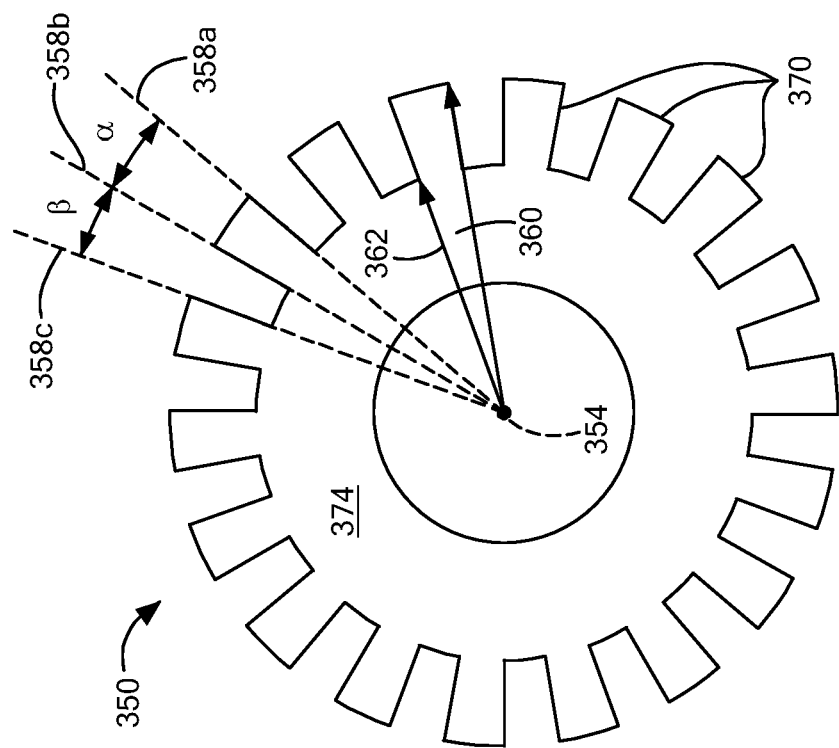
FIG. 3A shows another example target for use with the sensor of FIG. 1.
Figure 3:
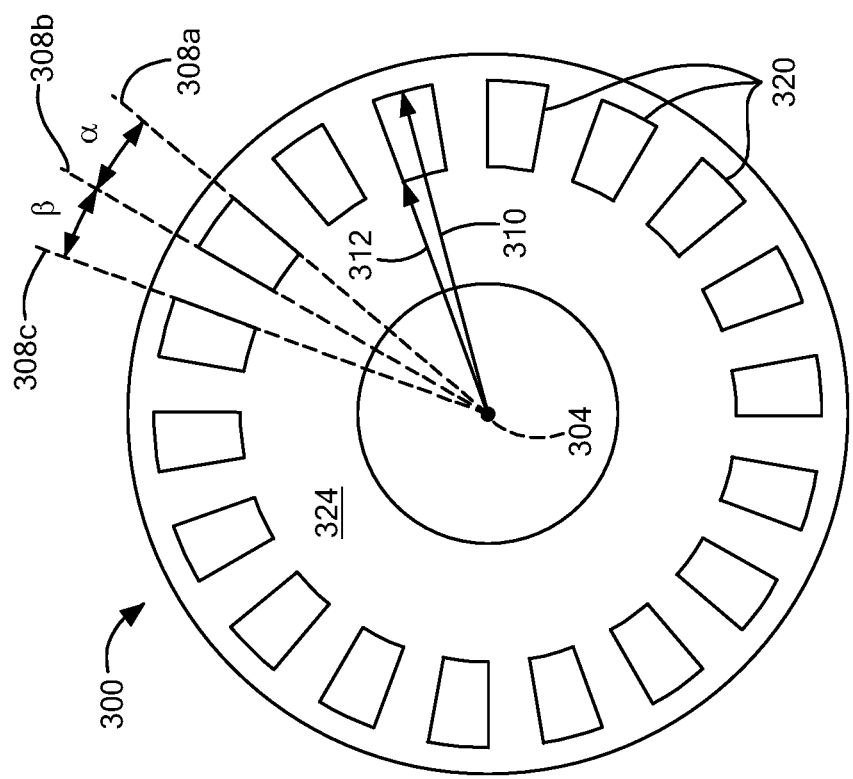
FIG. 3 shows an example target for use with the sensor of FIG. 1.

Referring also to FIG. 3, an example target 300 that can be used for both magnetic sensing and inductive sensing by an above-described sensor 66, 260 of FIGS. 1 and 2 is shown. To this end, the material of target 300 is conductive and ferromagnetic. In use, a back bias magnet is positioned proximate to the target 300 and sensor to generate a magnetic field for sensing by the magnetic field sensor.

Target 300 has a central axis 304 (perpendicular to the page) about which the target rotates and radial axes that rotate as the target rotates as illustrated by axes 308a, 308b, 308c. Target 300 has an outer radius 310 and an inner radius 312 and a plurality of features 320 positioned around the target circumference between the outer radius and the inner radius in a target plane 324. In the example target 300, features 320 can be cut outs, or apertures of various shapes. Features 320 can have a circumferential width illustrated by an angle $\alpha$. Features 320 can be repeated after an angle $\beta$, that can be equal to or different than $\alpha$. The number of features 320 can correspond to the number of periods of the target 300.

FIG. 3A shows another example target 350 that can be used for both magnetic field sensing and inductive sensing by an above-described sensor 66, 260 of FIGS. 1 and 2. Like target 300, target 350 has a central axis 354 (perpendicular to the page) about which the target rotates and radial axes as illustrated by axes 358a, 358b, 358c. Target 350 has an outer radius 360 and an inner radius 362 and a plurality of features 370 positioned around the target circumference between the outer radius and the inner radius in a target plane 374. In the example target 350, features 370 can take the form of teeth or protrusions separated by slots or "valleys", as shown. Features 370 have a circumferential width illustrated by an angle $\alpha$ that can repeat after an angle $\beta$ that can be equal to or different than $\alpha$.

Figure 4A:
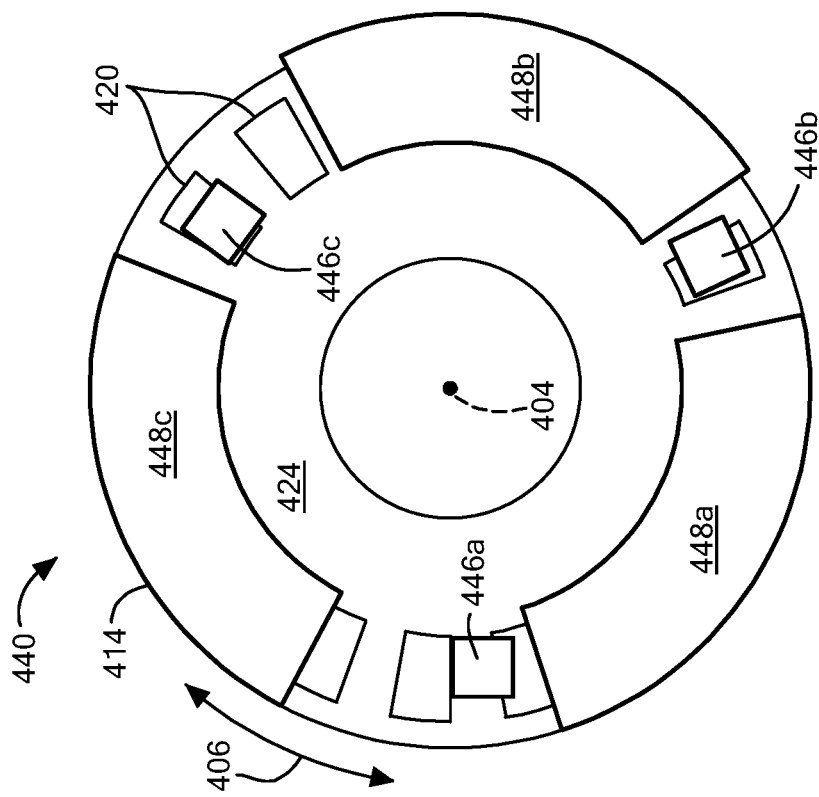
FIG. 4A shows an alternative arrangement for the sensor of FIG. 1 including the target of FIG. 3 and including a plurality of sensors.
Figure 4:
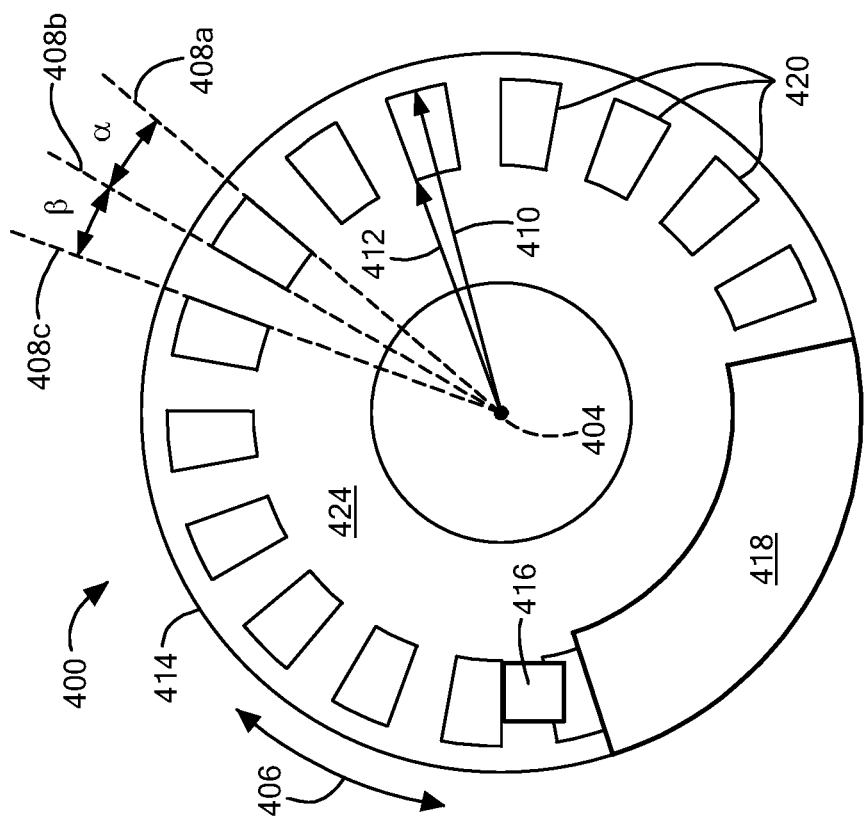
FIG. 4 shows an arrangement for the sensor of FIG. 1 including the target of FIG. 3.

Referring also to FIG. 4, an example on axis heterogeneous sensor system 400 illustrates an arrangement of a magnetic field sensor 416 and an inductive sensor 418 relative to a rotating target 414 that can be the same as or similar to target 300 of FIG. 3. Thus, target 414 can have a central axis 404 (perpendicular to the page) about which the target rotates and radial axes as illustrated by axes 408a, 408b, 408c. Target 414 has an outer radius 410 and an inner radius 412 and a plurality of features 420 positioned around the target circumference between the outer radius and the inner radius in a target plane 424.

Target 414 can be comprised of a conductive ferromagnetic material and, in use, a back bias magnet (not shown) is positioned proximate to the target and magnetic field sensor 416 to generate a magnetic field for sensing by the magnetic field sensor.

The magnetic field sensor 416 can be the same as or similar to magnetic field sensor 20 of FIG. 1 and the inductive sensor 418 can be the same as or similar to inductive sensor 40 of FIG. 1. In the arrangement of FIG. 4 however, magnetic field sensor 416 and inductive sensor 418 are not integrated into a package 66 or IC 60, but rather are shown as separate elements.

Inductive sensor 418 can be arc-shaped as shown and can include interface circuitry and primary and secondary coils.

In the arrangement of FIG. 4, the magnetic field sensor 416 and the inductive sensor 418 are positioned adjacent to each other in a circumferential direction (i.e., the direction of target rotation) illustrated by arrow 406 with respect to the target axis of rotation 404.

FIG. 4A shows an alternative on axis heterogeneous sensor system 440 including target 414 (FIG. 4) and a plurality of magnetic field sensors 446a, 446b, 446c and inductive sensors 448a, 448b, 448c for additional redundancy purposes. Each of the magnetic field sensors 446a, 446b, 446c can be positioned adjacent to a respective inductive sensor 448a, 448b, 448c, as shown.

Target 414 can be comprised of a conductive ferromagnetic material and, in use, back bias magnets (not shown) are positioned proximate to the target and to each of the sensors 446a, 446b, 446c to generate a magnetic field for sensing by the magnetic field sensors.

Each magnetic field sensor 446a, 446b, 446c can be the same as or similar to magnetic field sensor 20 of FIG. 1 and each inductive sensor 448a, 448b, 448c can be the same as or similar to inductive sensor 40 of FIG. 1. In the arrangement of FIG. 4A however, the magnetic field sensors 446a, 446b, 446c and inductive sensors 448a, 448b, 448c are not integrated into a single package 66 or IC 60, but rather are shown as separate elements.

Inductive sensors 448a, 448b, 448c can be arc-shaped as shown and can include interface circuitry and primary and secondary coils.

In the arrangement of FIG. 4A, the magnetic field sensors 446a, 446b, 446c and the inductive sensors 448a, 448b, 448c are positioned adjacent to each other in a circumferential direction (i.e., the direction of target rotation) illustrated by arrow 406 with respect to the target axis of rotation 404.

It will be appreciated that while the system 440 is shown to include three magnetic sensors 446a, 446b, 446c and three inductive sensors 448a, 448b, 448c, other numbers (fewer or greater than three) can be used to achieve a different level of redundancy.

Figure 4C:
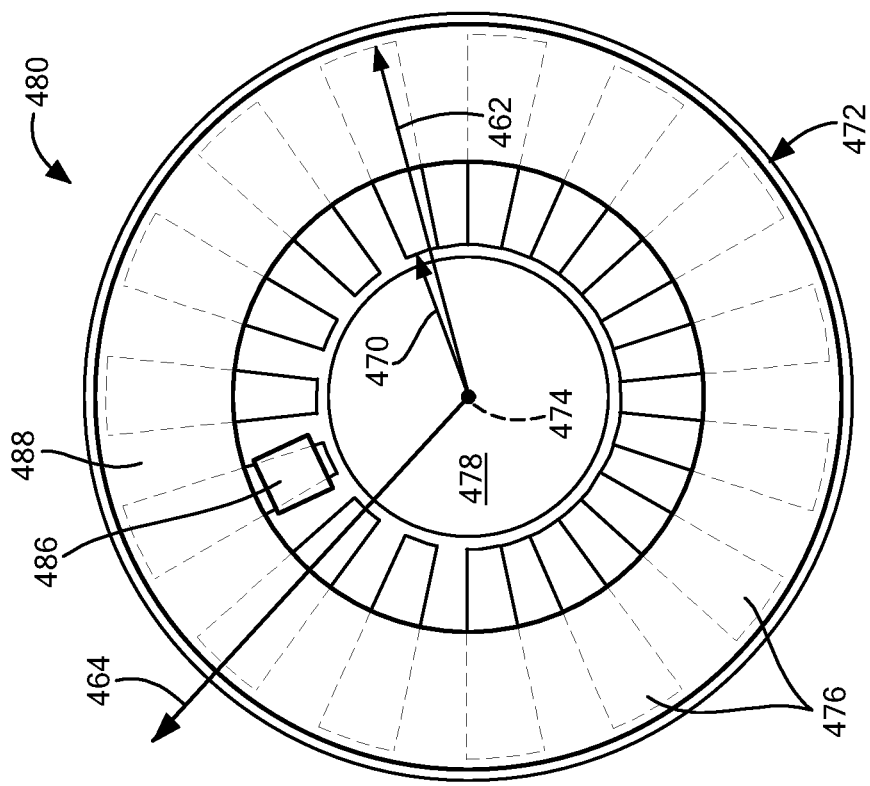
FIG. 4C shows yet another alternative arrangement for the sensor of FIG. 1.
Figure 4B:
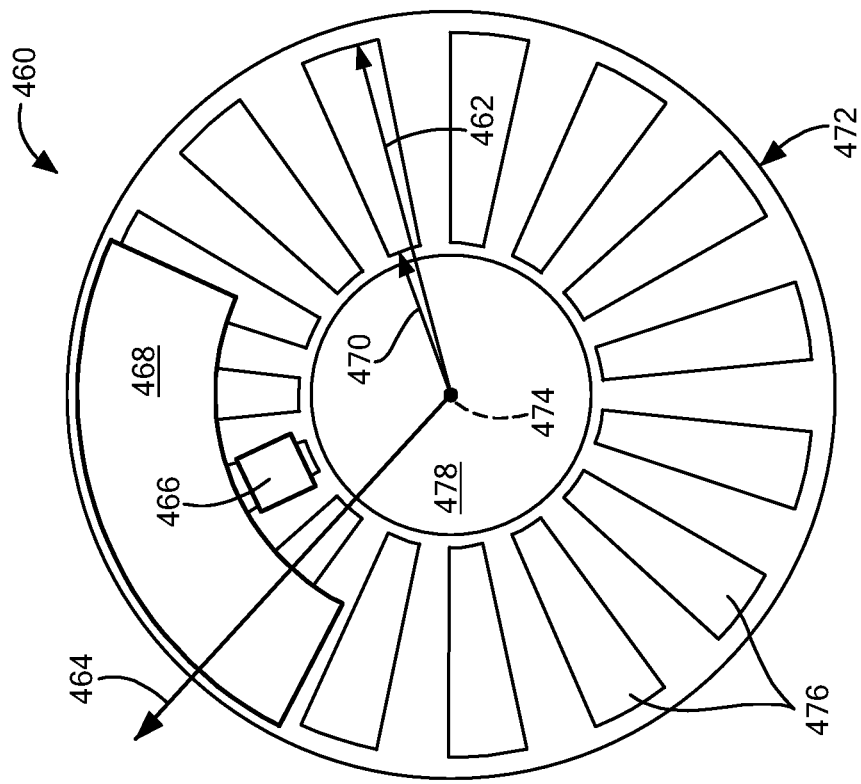
FIG. 4B shows another alternative arrangement for the sensor of FIG. 1.

FIG. 4B shows another on axis heterogeneous sensor system 460 including a magnetic field sensor 466 and an inductive sensor 468 relative to a rotating target 472. Target 472 can have a central axis 474 (perpendicular to the page) about which the target rotates and radial axes as illustrated by axis 464. Features 476 of the target 472 are positioned around the target circumference between an outer radius 462 and an inner radius 470 in a target plane 478. Target 472 can differ from target 414 (FIGS. 4, 4A) in that the features 476 are larger in the radial direction 464 than features 420 of target 414.

Target 472 can be comprised of a conductive ferromagnetic material and, in use, a back bias magnet (not shown) is positioned proximate to the target and magnetic field sensor 466 to generate a magnetic field for sensing by the magnetic field sensor 466.

The magnetic field sensor 466 can be the same as or similar to magnetic field sensor 20 of FIG. 1 and the inductive sensor 468 can be the same as or similar to inductive sensor 40 of FIG. 1. In the arrangement of FIG. 4B however, magnetic field sensor 466 and inductive sensor 468 are not integrated into a single package 66 or IC 60, but rather are shown as separate elements.

Inductive sensor 468 can be arc-shaped as shown and can include interface circuitry and primary and secondary coils.

In the arrangement of FIG. 4B, the magnetic field sensor 466 and the inductive sensor 468 are positioned adjacent to each other in a radial direction (i.e., the direction of radial axis 464) with respect to the target axis of rotation 474. Thus, the magnetic field sensor 466 and the inductive sensor 468 are at different radial distances from the center 474 of the target 472. The design of target features 476 accommodates positioning of the magnetic field sensor 466 and inductive sensor 468 in this manner.

It will be appreciated by those of ordinary skill in the art that although the inductive sensor 468 is shown to be positioned adjacent to the outside edge of the target 472, in other implementations, inductive sensor 468 can be positioned closer to the target center 474 than the magnetic field sensor 466.

FIG. 4C shows yet another on axis heterogeneous sensor system 480 including a magnetic field sensor 486 and an inductive sensor 488 relative to rotating target 472 (FIG. 4B). Thus, target 472 can have a central axis 474 (perpendicular to the page) about which the target rotates and radial axes as illustrated by axis 464. Features 476 of the target 472 are positioned between an outer radius 462 and an inner radius 470 in a target plane 478.

Target 472 can be comprised of a conductive ferromagnetic material and, in use, a back bias magnet (not shown) is positioned proximate to the target and magnetic field sensor 486 to generate a magnetic field for sensing by the magnetic field sensor.

The magnetic field sensor 486 can be the same as or similar to magnetic field sensor 20 of FIG. 1 and the inductive sensor 488 can be the same as or similar to inductive sensor 40 of FIG. 1. In the arrangement of FIG. 4C however, magnetic field sensor 486 and inductive sensor 488 are not integrated into a single package 66 or IC 60, but rather are shown as separate elements.

Inductive sensor 488 can have a round, O-ring shape as shown and can include interface circuitry and primary and secondary coils.

In the arrangement of FIG. 4C, the magnetic field sensor 486 and the inductive sensor 488 are positioned adjacent to each other in a radial direction (i.e., the direction of radial axis 464) with respect to the target axis of rotation 474. Thus, the magnetic field sensor 486 and the inductive sensor 488 are at different radial distances from the center 474 of the target 472. The design of target features 476 accommodates positioning of the magnetic field sensor 486 and inductive sensor 488 in this manner.

It will be appreciated by those of ordinary skill in the art that although the inductive sensor 488 is shown to be positioned adjacent to the outside edge of the target 472, in other implementations, inductive sensor 488 can be positioned closer to the target center 474 than the magnetic field sensor 486.

Figure 5:
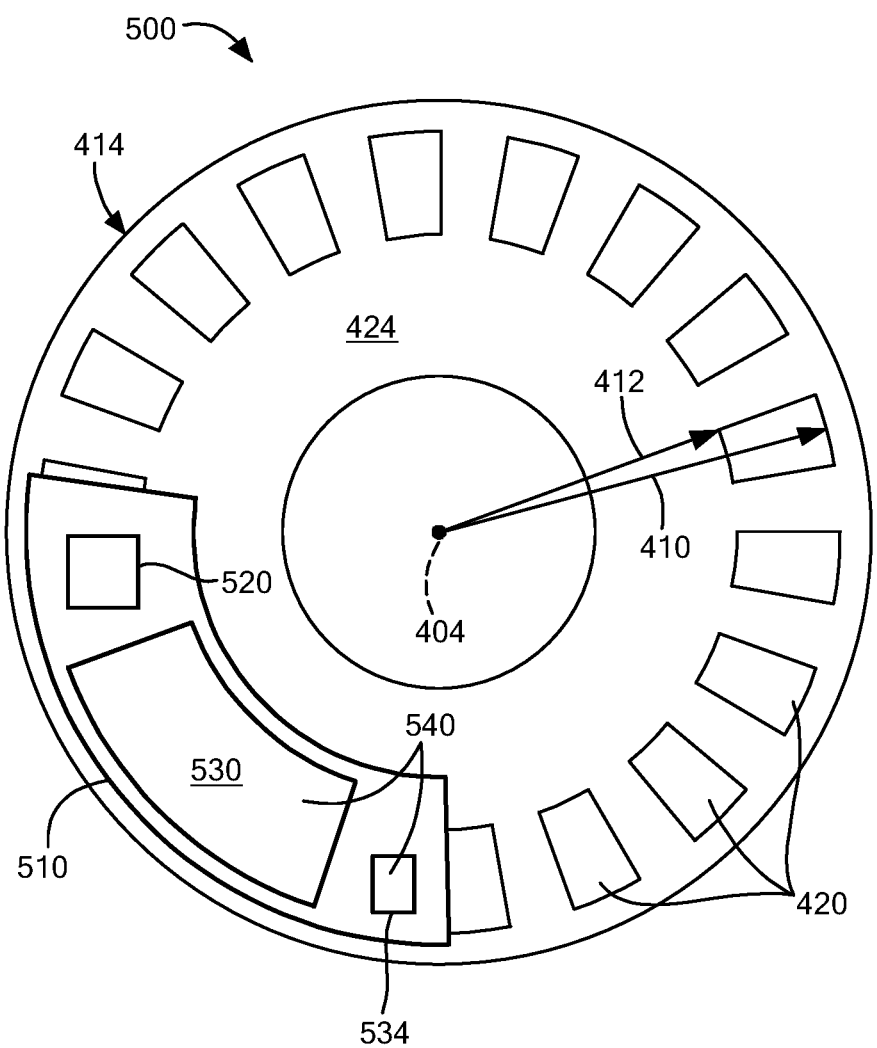
FIG. 5 shows another arrangement for the sensor of FIG. 1.

Referring to FIG. 5, another on axis heterogeneous sensor system 500 includes target 414 (FIG. 4) and a sensor PCB 510 supporting a magnetic field sensor 520 and inductive sensor 540. Thus, target 414 can have a central axis 404 (perpendicular to the page) about which the target rotates, an outer radius 410, an inner radius 412, and a plurality of features 420 positioned around the target circumference between the outer radius and the inner radius in a target plane 424. Target 414 can be comprised of a conductive ferromagnetic material and, in use, a back bias magnet (not shown) is positioned proximate to the target and magnetic field sensor 520 to generate a magnetic field for sensing by the magnetic field sensor.

Magnetic field sensor 520 can be the same as or similar to magnetic field sensor 20 of FIG. 1 and inductive sensor 540 can be the same as or similar to inductive sensor 40 of FIG. 1. Thus, inductive sensor 540 includes primary and secondary coils, here illustrated as an arc-shaped element 530, and interface circuitry 534.

The magnetic field sensor 520 and the inductive sensor elements 530, 534 can mounted on the sensor PCB 510 in various positions, such as the circumferentially adjacent positioning shown. Magnetic field sensor 520 and inductive interface circuitry 534 can each take the form of respective ICs. Inductive sensor coils 530 can be formed on the PCB 510. In some embodiments, the coils 530 can be configured with the primary or transmit coil encompassing the secondary or receive coils, for example on the same layer of a two layer PCB.

Figure 6:
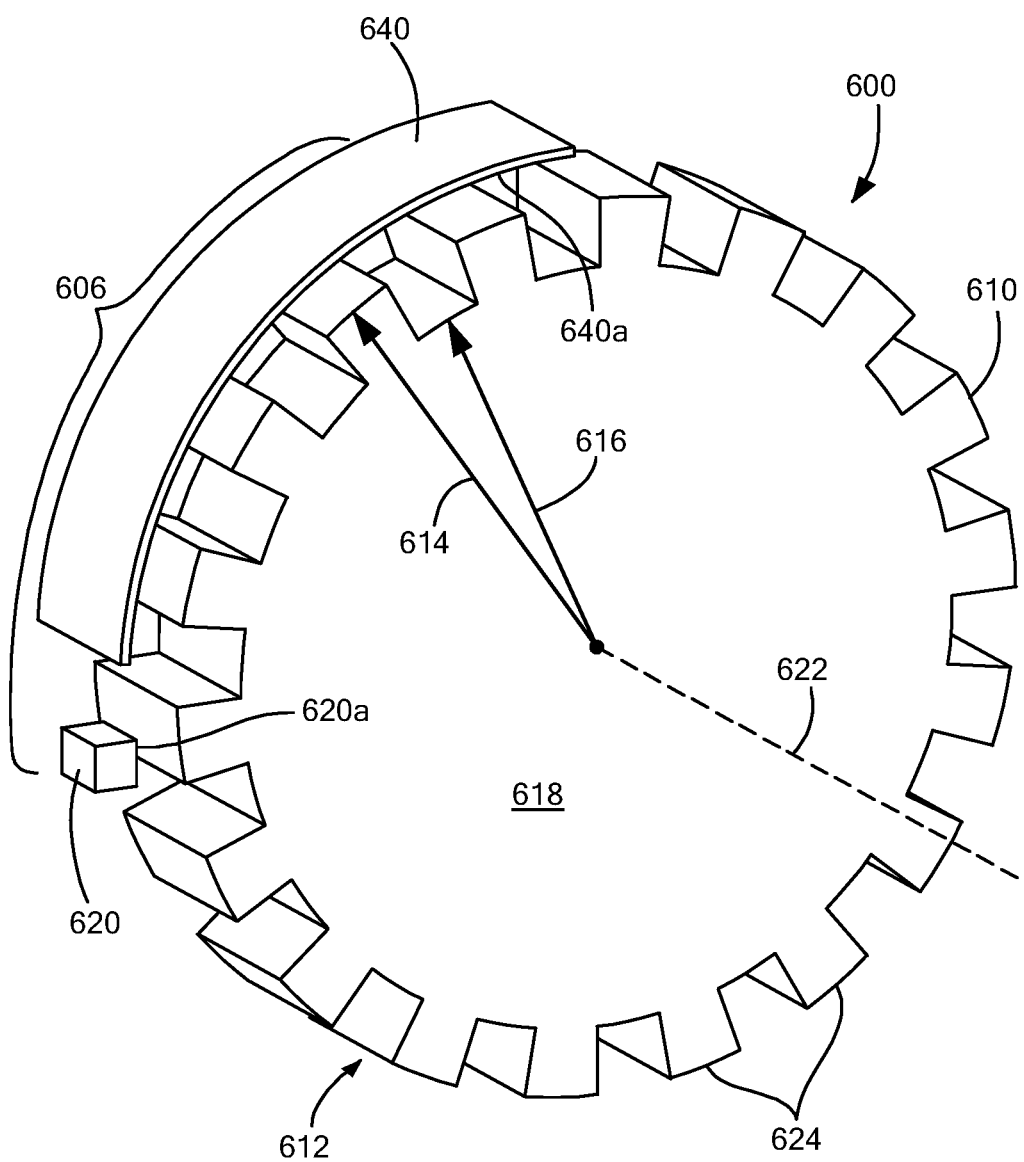
FIG. 6 illustrates a "off axis" configuration of the sensor of FIG. 1.

Referring also to FIG. 6, a sensor system 600 illustrates an example "off axis" or "side shaft" configuration of a heterogeneous sensor 606 positioned proximate to a rotatable target 610. Sensor 606 can be the same as or similar to sensor package 66 of FIG. 1 and thus, can include a magnetic field sensor 620 having magnetic field sensing elements and an inductive sensor 640 having a primary coil and two or more secondary coils. Target 610 can be the same as or similar to target 14 of FIG. 1 and thus, can include at least a portion that is conductive for sensing by inductive sensor 640. The relative sizes of the elements of system 600 are not necessarily sized to scale but are illustrative only of the relative placement of the sensor 606 and target 610.

In embodiments in which the same target is used for both magnetic and inductive sensing, target 610 can be comprised of a conductive ferromagnetic material and, in use, a back bias magnet (not shown) can be positioned proximate to the target and sensor to generate a magnetic field affected by movement of the target for sensing by the magnetic field sensor 620. Alternatively, a ring magnet can be attached to a conductive non-ferromagnetic or ferromagnetic target to generate a magnetic field for sensing by the magnetic field sensor 620, in which case the back bias magnet can be eliminated.

In some implementations, target 610 is rotatable about a central axis of rotation 622. Target 610 has features 624 for sensing by sensors 620, 640. Features 624 are positioned around the target circumference between an outer radius 614 (that can be coincident with an outer radius of the target) and an inner radius 616 of the target 610. The illustrated target 610 is a gear having teeth 624 separated by slots or "valleys".

Target 610 can have a target plane 618 orthogonal with respect to the axis of rotation 622 and the target features 624 are located on a circumferential edge 612 of the target (i.e., substantially tangential to the outer radius 614 of the target 610). By "off axis" it is meant that the sensor 606 has a major surface supporting magnetic field sensing elements (e.g., sensing elements 30 of FIG. 1) in a sensing plane that faces (i.e., is substantially tangential with respect to) the circumferential edge 612 of the target. In other words, in off axis embodiments, a sensing plane 640a of the inductive sensor 640 and a sensing plane 620a of the magnetic field sensor 620 face the target edge 612, as shown, and sensing planes 620a, 640a are generally orthogonal with respect to major target surface 618.

The inductive sensor 640 including primary and secondary coils and interface circuitry can be mounted on a flexible, curved printed circuit board.

It will be appreciated that while the side shaft sensor system 600 is shown to have the magnetic field sensor 620 separately packaged with respect to the inductive sensor 640, in some implementations, the magnetic field sensor 620 and the inductive sensor 640 (or at least interface circuitry portions of the inductive sensor) can be provided in the same package, can be mounted on the same PCB, and/or can be integrated into the same IC.

Figure 7:
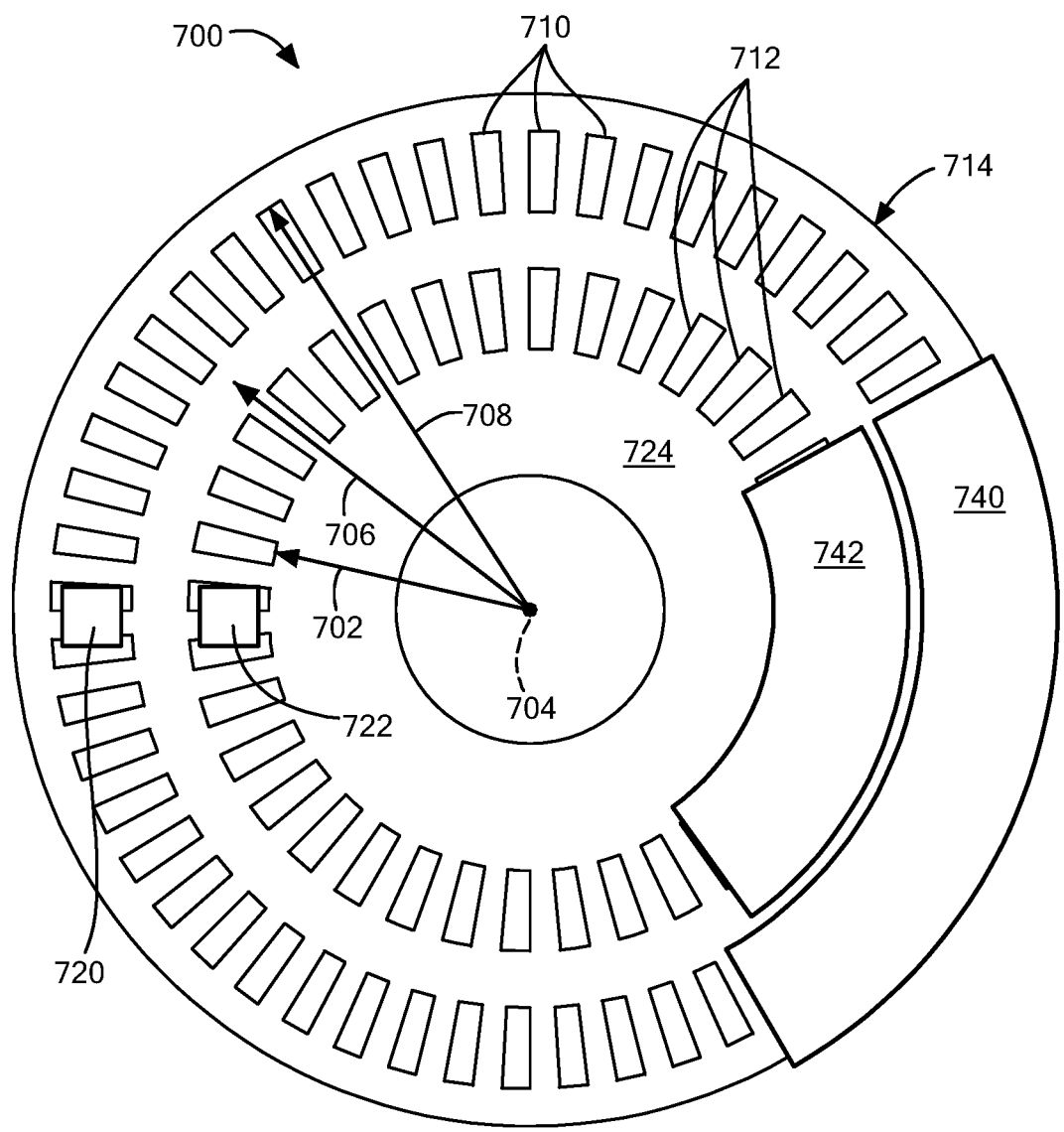
FIG. 7 shows an arrangement for the sensor of FIG. 1 including a plurality of sensors and a target that includes a plurality of tracks for absolute position sensing.

Referring to FIG. 7, a heterogeneous sensing system 700 is shown to include a target 714 having two sets of features, as may be referred to as so-called tracks, in order to detect the absolute position of the target (i.e., absolute rotational angle). Reference numbers 710, 712 can refer interchangeably to tracks and the features of the tracks. Features 710, 712 can be positioned around the target circumference in a target plane 724 that is orthogonal with respect to an axis of rotation 704 (perpendicular to the page) about which the target rotates. More particularly, the target 714 has an outer radius 708, an intermediate radius 706, and an inner radius 702, and the first track of features 710 extends from the outer radius to the intermediate radius and the second track of features 712 extends from the intermediate radius to the inner radius, as shown. Features 710, 720 can take the form of cut-outs or apertures in the target material. However, it will be appreciated that the features 710, 712 can take various forms.

Sensor system 700 includes a magnetic field sensor and inductive sensor positioned proximate to each track 710, 712. Magnetic field sensor 720 and inductive sensor 740 are positioned to sense features of track 710 and magnetic field sensor 722 and inductive sensor 742 are positioned to sense features of track 712. The magnetic field sensors 720, 722 and the inductive sensors 740, 742 can be positioned in a sensing plane that is substantially parallel with respect to the target plane 724.

In embodiments in which the same target is used for both magnetic and inductive sensing, target 714 can be comprised of a conductive ferromagnetic material and, in use, a first back bias magnet (not shown) is positioned proximate to the first magnetic field sensor 720 to generate a magnetic field for sensing by the magnetic field sensor 720 and a second back bias magnet (not shown) is positioned proximate to the second magnetic field sensor 722 to generate a magnetic field for sensing by the magnetic field sensor 722.

Tracks 710, 712 can have different numbers of features and can have different spacing between adjacent features. Given that tracks 710, 712 with different numbers of features will have a different number of magnetic poles, it is possible to determine the absolute angular position of the target 714 using the Nonius principle. Along the tracks 710, 712, there is a continuing shift of pole alignment between the two tracks. Each track 710, 712 provides position information with the same periodicity as its number of poles. The absolute angular position of the target 714 can be determined based on the difference in information provided by the two tracks. Stated differently, with this arrangement, it is possible to use the Nonius principle with a track 710 having N features and another track 712 having N+1 features to calculate the absolute mechanical angle.

While each magnetic sensor 720, 722 is shown to be circumferentially offset from a respective inductive sensor 740, 742 in some implementations the magnetic field sensors can be closer to (i.e., less circumferentially offset from) or further from (i.e., more circumferentially offset from) the respective inductive sensor than shown. It will also be appreciated that while one magnetic field sensor and inductive sensor are shown to sense each track 710, 712, in some implementations, more than one magnetic field sensor and inductive sensor can be used to sense each track for additional redundancy.

Figure 8:
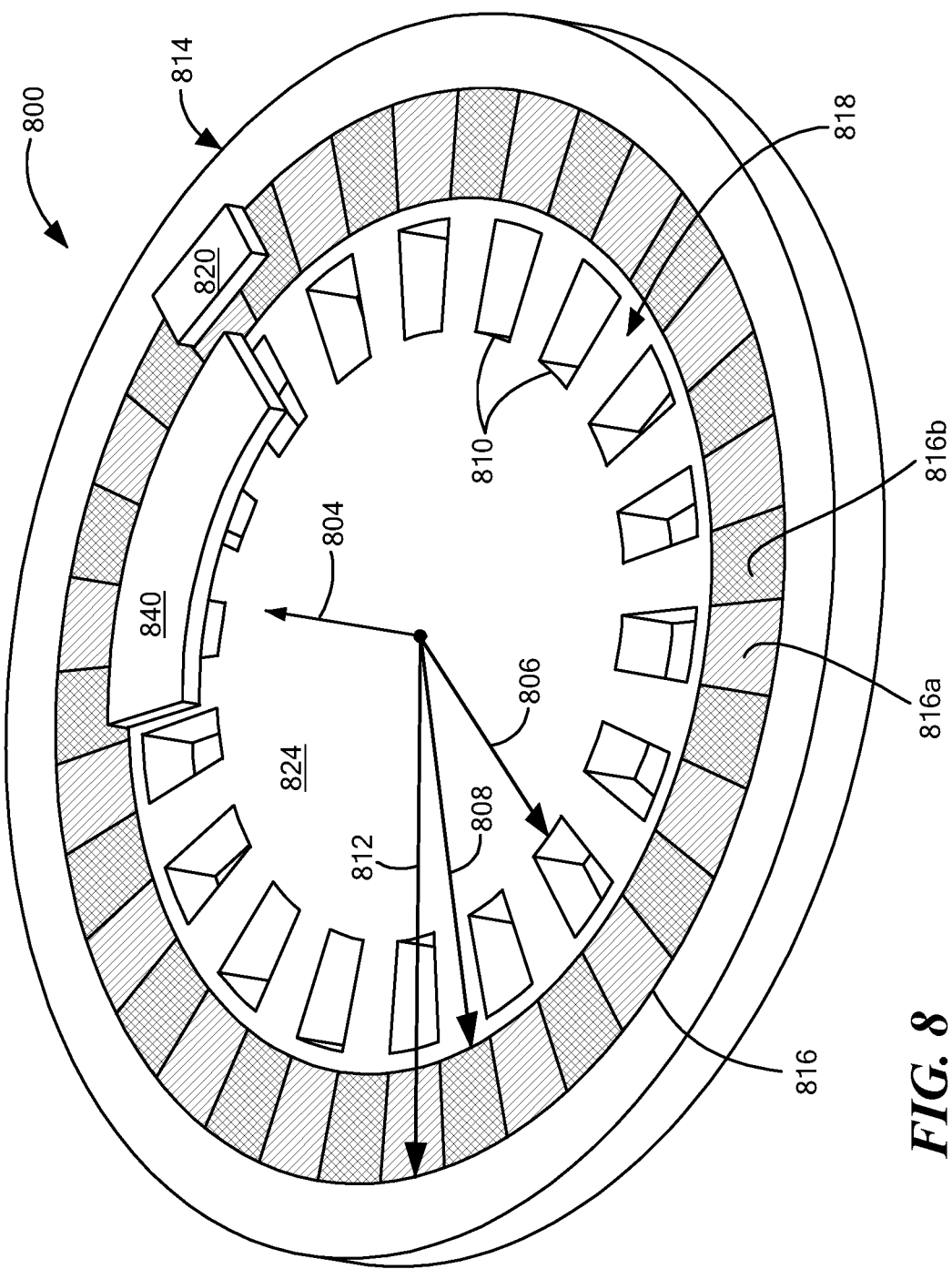
FIG. 8 shows an arrangement of the sensor of FIG. 1 with a target having a magnetic sensing portion and an inductive sensing portion.

Referring also to FIG. 8, a heterogeneous sensing system 800 includes a target 814 having a first target portion 816 optimized for sensing by a magnetic field sensor 820 and a second target portion 818 optimized for sensing by an inductive sensor 820. Target 814 has a central axis 804 about which the target rotates. Target 814 has an outer radius 812, an intermediate radius 808, and an inner radius 806. The magnetic sensing target portion 816 can be positioned between the outer radius 812 and the intermediate radius 808 and the inductive sensing target portion 818 can be positioned between the intermediate radius 808 and the inner radius 806, as shown.

Inductive sensing target portion 818 is comprised of a conductive material. Features 810 of inductive sensing target portion 818 can take the form of cutouts or apertures in the target material spaced around the target circumference, as shown.

Magnetic sensing target portion 816 can take the form of a ring magnet having alternating magnetized domains around its circumference, two of which are labeled 816a, 816b. Target portion 816 can be comprised of a non-ferromagnetic material.

The target portion 816 and the target portion 818 can be positioned adjacent to each other in a radial direction and in a target plane 824 that is orthogonal with respect to the axis of rotation 804, as shown. It will be appreciated that while the magnetic target portion 816 is positioned concentrically outside of the inductive target portion 818, the positions of the target portions 816, 818 can be reversed.

The target 814 can be manufactured by forming the inductive sensing portion 818 with cutouts 810, as shown, such as by machining. A channel or groove can be machined into the target material and the ring magnet 816 can be separately manufactured and inserted into the channel to form the target 814. In this way, the ring magnet 816 can be embedded in the main target body.

Magnetic field sensor 820 as may be the same as or similar to sensor 20 of FIG. 1 is positioned proximate to the magnetic sensing target portion 816 and inductive sensor 840 as may be the same as or similar to inductive sensor 40 of FIG. 1 is positioned proximate to the inductive sensing target portion 818. The magnetic field sensor 820 and the inductive sensor 840 are positioned with their respective sensing elements in a sensing plane that is substantially parallel with respect to target plane 824.

In use, magnetic field sensing elements of the magnetic field sensor 820 detect the magnetic field generated by the ring magnet 816 as features 816a, 816b pass by the sensor 820 when the target rotates and inductive pick up coils of the inductive sensor 840 detect the magnetic field generated by eddy currents in the inductive target portion 818 as features 810 pass by the sensor 840 when the target rotates. The conductive material of the inductive target portion 818 can be magnetically transparent and in example embodiments, comprises aluminum.

It will be appreciated that the magnetic field sensor 820 and inductive sensor 840 can be less or more radially offset from each other than is shown. It will be further appreciated that more than one magnetic field sensor and/or inductive sensor can be used for additional redundancy. Also, more than one inductive sensing target portion 818 and magnetic sensing portion 816 with additional magnetic and inductive sensors can be provided to implement absolute angle sensing using the Nonius principle.

Figure 9:
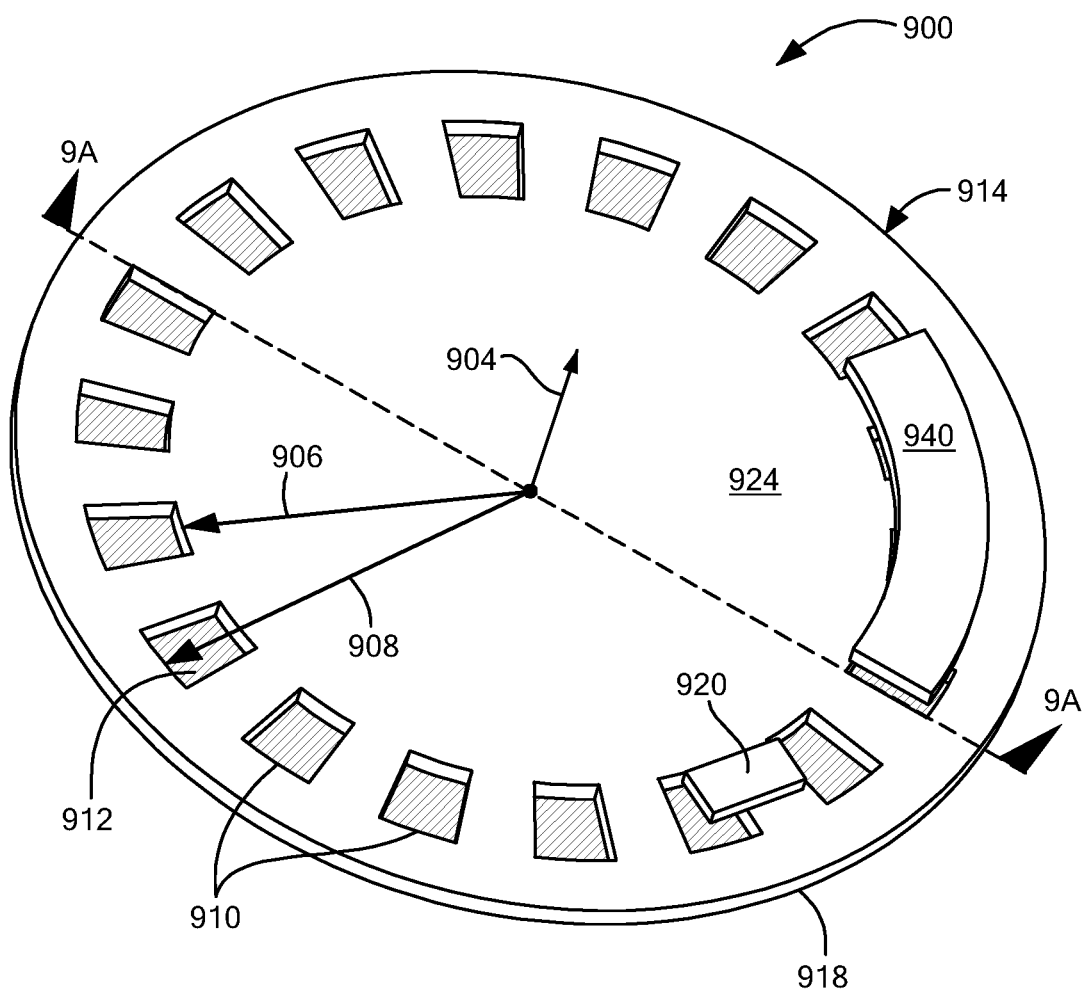
FIG. 9 shows an alternative arrangement for the sensor of FIG. 1 with a target having a magnetic sensing portion and an inductive sensing portion.
Figure 9A:
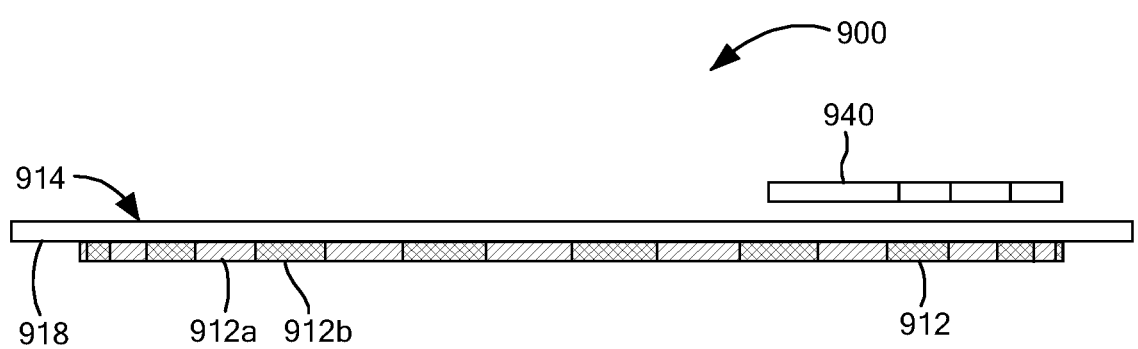
FIG. 9A is a cross-sectional side view of the sensing system of FIG. 9.

Referring also to FIGS. 9 and 9A, an alternative heterogeneous sensing system 900 includes a target 914 having a first target portion 912 optimized for sensing by a magnetic field sensor 920 and a second target portion 918 optimized for sensing by an inductive sensor 940. FIG. 9A is a cross-sectional side view taken along line 9A-9A of FIG. 9.

Target 914 has a central axis 904 about which the target rotates. Target 914 has an outer radius 908 and an inner radius 906. The magnetic sensing target portion 912 and the inductive sensing target portion 918 can have features positioned between the outer radius 908 and the inner radius 906 in a target plane 924, as shown.

Inductive sensing target portion 918 is comprised of a conductive material. Features 910 of inductive sensing target portion 918 can take the form of cutouts or apertures in the target material spaced around the target circumference, as shown.

Magnetic sensing target portion 912 can take the form of a ring magnet having alternating magnetized domains around its circumference, two of which are labeled 912a, 912b. Target portion 912 can be comprised of a non-ferromagnetic material.

The target portion 912 and the target portion 918 can be positioned adjacent to each other in an axial direction that is parallel with respect to the axis of rotation 904 as can be seen from the cross-sectional side view of FIG. 9A. Various manufacturing techniques for fabricating the target 914 are possible. For example, ring magnet 912 and inductive sensing target portion 918 can be separately manufactured and the ring magnet 912 can be glued or otherwise secured to the main target body 918.

Magnetic field sensor 920 as may be the same as or similar to sensor 20 of FIG. 1 is positioned proximate to the magnetic sensing target portion 912 and inductive sensor 940 as may be the same as or similar to inductive sensor 40 of FIG. 1 is positioned proximate to the features 910 of the inductive sensing target portion 918. The magnetic field sensor 920 and the inductive sensor 940 are positioned adjacent to each other in a circumferential direction with respect to the axis of rotation 904 and in a sensing plane that is substantially parallel with respect to the target plane 924.

In use, magnetic field sensing elements of the magnetic field sensor 920 detect the magnetic field generated by the ring magnet 912 as features 912a, 912b pass by the sensor 920 when the target rotates and inductive pick up coils of the inductive sensor 940 detect the magnetic field generated by eddy currents induced in the inductive target portion 918 as features 910 pass by the sensor 940 when the target rotates. The conductive material of the inductive target portion 918 can be magnetically transparent and in example embodiments, comprises aluminum.

It will be appreciated that the magnetic field sensor 920 and inductive sensor 940 can be less or more circumferentially offset from each other than is shown. It will be further appreciated that more than one magnetic field sensor and/or inductive sensor can be used for additional redundancy.

Figure 10:
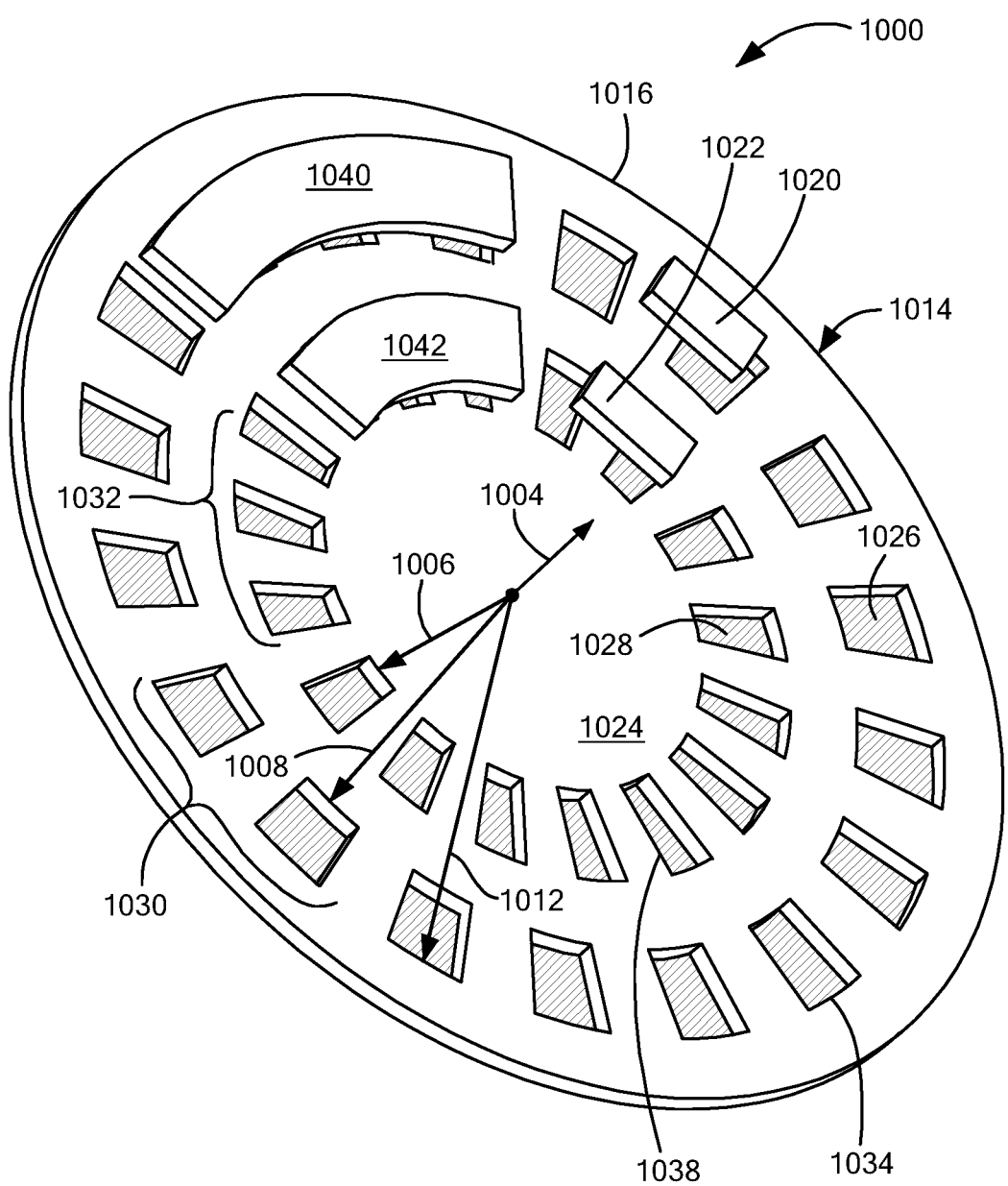
FIG. 10 shows another arrangement for the sensor of FIG. 1 including a plurality of sensors and a target that includes a plurality of tracks for absolute position sensing.
Figure 10A:
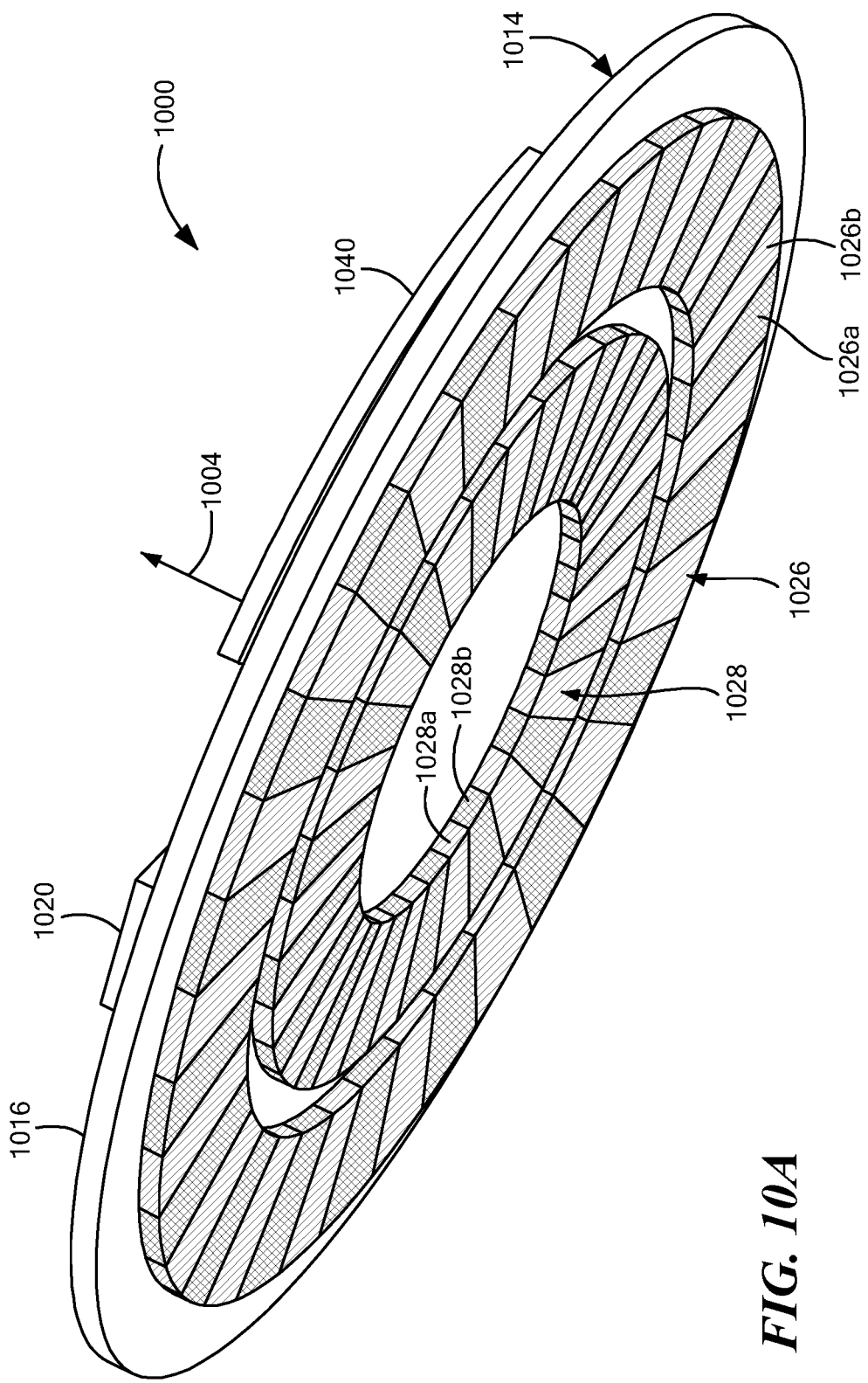
FIG. 10A is a perspective bottom view of the sensing system of FIG. 10.

Referring also to FIGS. 10 and 10A, a heterogeneous sensing system 1000 includes a target 1014 having two portions 1026, 1028 optimized for magnetic sensing and a two portions 1034, 1038 of a target body 1016 optimized for inductive sensing. The first magnetic sensing target portion 1026 together with the first inductive target portion 1034 can establish a first so-called track 1030 and the second magnetic sensing target portion 1028 together with the second inductive target portion 1038 can establish a second so-called track 1032. Use of two target tracks 1030, 1032 can facilitate detection of the absolute position of the target 1014 (i.e., absolute rotational angle). FIG. 10A is a bottom perspective view of the arrangement of FIG. 10.

Target portions 1034, 1038 can be positioned in a target plane 1024 that is orthogonal with respect to an axis of rotation 1004 about which the target rotates. More particularly, the target 1014 has an outer radius 1012, an intermediate radius 1008, and an inner radius 1006. The first track 1030 is positioned between the outer radius 1012 and the intermediate radius 1008 and the second track 1032 is positioned between the intermediate radius 1008 to the inner radius 1006, as shown.

Magnetic sensing target portions 1026, 1028 can take the form of ring magnets having alternating magnetized domains, two of which for each such target portion are labeled 1026a, 1026b and 1028a, 1028b (FIG. 10A), respectively. Target portions 1026, 1028 can be comprised of a non-ferromagnetic material.

Features of the first and second inductive sensing target portions 1034, 1038 can take the form of cut-outs or apertures in the material of the target body 1016. However, it will be appreciated that the features can take various forms.

The magnetic sensing target portions 1026, 1028 can be positioned adjacent to the respective inductive sensing target portion 1034, 1038 in an axial direction that is parallel with respect to the axis of rotation 1004 as can be seen from the view of FIG. 10A. Various manufacturing techniques are possible for fabricating the target 1014. For example, ring magnets 1026, 1028 and inductive sensing target body 1016 can be separately manufactured and the ring magnets 1026, 1028 can be glued or otherwise secured to the target body 1016.

Sensor system 1000 includes a magnetic field sensor and inductive sensor positioned proximate to each track 1030, 1032. Magnetic field sensor 1020 and inductive sensor 1040 are positioned to sense features of track 1030 and magnetic field sensor 1022 and inductive sensor 1042 are positioned to sense features of track 1032. The magnetic field sensors 1020, 1022 and the inductive sensors 1040, 1042 can be positioned in a sensing plane that is substantially parallel with respect to the target plane 1024 with magnetic field sensor 1020 adjacent to inductive sensor 1040 in a circumferential direction and magnetic field sensor 1022 adjacent to inductive sensor 1042 in a circumferential direction, as shown. Magnetic field sensors 1020, 1022 can be the same as or similar to sensor 20 of FIG. 1 and inductive sensors 1040, 1042 can be the same as or similar to inductive sensor 40 of FIG. 1.

Tracks 1030, 1032 can have different numbers of features (e.g., cut outs in the case of inductive sensing target portions 1034, 1038 and magnetized pole pairs 1026a, 1026b and 1028a, 1028b in the case of magnetic sensing ring magnets 1026, 1028, respectively) and can have different spacing between features. Given that tracks 1030, 1032 with different numbers of features will have a different number of magnetic poles, it is possible to determine the absolute angular position of the target 1014 using the Nonius principle. Along the tracks 1030, 1032, there is a continuing shift of pole alignment between the two tracks. Each track 1030, 1032 provides position information with the same periodicity as its number of poles. The absolute angular position of the target 1014 can be determined based on the difference in information provided by the two tracks. Stated differently, with this arrangement, it is possible to use the Nonius principle with a track 1030 having N features and another track 1032 having N+1 features to calculate the absolute mechanical angle.

While each magnetic sensor 1020, 1022 is shown to be circumferentially offset from a respective inductive sensor 1040, 1042, in some implementations the magnetic field sensors can be closer to (i.e., less circumferentially offset from) or further from (i.e., more circumferentially offset from) the respective inductive sensor than shown. It will be appreciated that while one magnetic field sensor and inductive sensor are shown to sense each track 1030, 1032, in some implementations, more than one magnetic field sensor and inductive sensor can be used to sense each track for additional redundancy.

Figure 11:
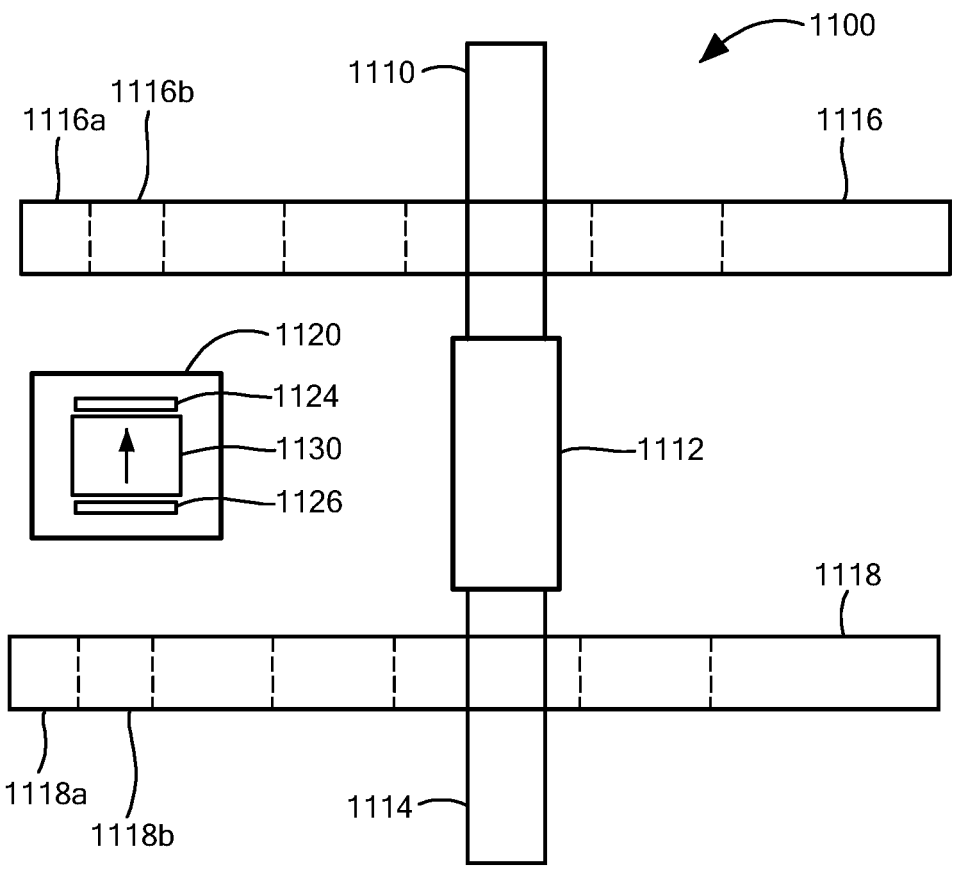
FIG. 11 shows a torque sensing system including a plurality of magnetic field sensors and targets.

Referring to FIG. 11, a torque sensing system 1100 including a magnetic field sensor 1120 is shown. Two targets 1116, 1118 can be coupled to a rotatable shaft having two portions or shafts 1110, 1114 coupled by an elastic element such as a torsion bar 1112, such that detection of a difference between an angle of the first target 1116 and an angle of the second target 1118 can indicate torque applied to the first and/or second shaft 1110, 1114. In other words, when a torque is applied, the angle of shafts 1110, 1114 will be slightly different depending on torque magnitude.

Each target 1116, 1118 can be a ferromagnetic target including features. For simplicity, only two features are labelled for each target as 1116a, 1116b and 1118a, 1118b. Such features may take the form of gear teeth in some implementations.

The torsion bar 1112 can be part of the physical connection between the shafts 1110, 1114 and can increase angle signal strength for angle measurements by creating a larger angle of twist (which is easier to measure/detect) for a given applied torque to either shaft 1110, 1114. The rotatable shafts 1110, 1114 can be parts of a steering column in an example automotive application.

A magnetic field sensor package 1120 is positioned between the first target 1116 and the second target 1118 and includes a first magnetic field sensor 1124 positioned proximate to the first target 1116 and that is configured to generate a first magnetic field output signal indicative of an angle of the first target and a second magnetic field sensor 1126 positioned proximate to the second target 1118 and that is configured to generate a second magnetic field output signal indicative of an angle of the second target. Magnetic field sensors 1124, 1126 can be the same as or similar to magnetic field sensor 20 of FIG. 1.

Magnetic field sensors 1124, 1126 share a back bias magnet 1130 that is positioned between the first and second magnetic field sensors and configured to generate a magnetic field that is affected by rotation of the targets 1116, 1118. In implementations, each magnetic field sensor 1124, 1126 can be supported by a respective semiconductor die that is mounted to an opposite surface of the back bias magnet 1130.

A processing unit, as may be part of the sensor 1120 or external to the sensor, can be coupled to receive the first and second magnetic field output signals from sensors 1124, 1126 and configured to determine a difference between the angle of the first target 1116 and the angle of the second target 1118 based on the first and second magnetic field output signals. A torque applied to the first shaft 1110 and/or to the second shaft 1114 can be calculated based on the angle difference.

The sensor 1120 can be mounted in the system 1100 in various configurations to meet system requirements. As one non-limiting example, a PCB can be mounted to a stationary sleeve coupled to the rotatable shafts 1110, 1114 and can be provided with an aperture in which the magnetic field sensor package 1120 is positioned. Mounting of the sensor 1120 can be achieved to ensure that the airgap (i.e., the distance from the sensing elements to the respective target) is the same for both sensors 1124, 1126. A concentrator (not shown) can be used to improve performance.

Figure 12:
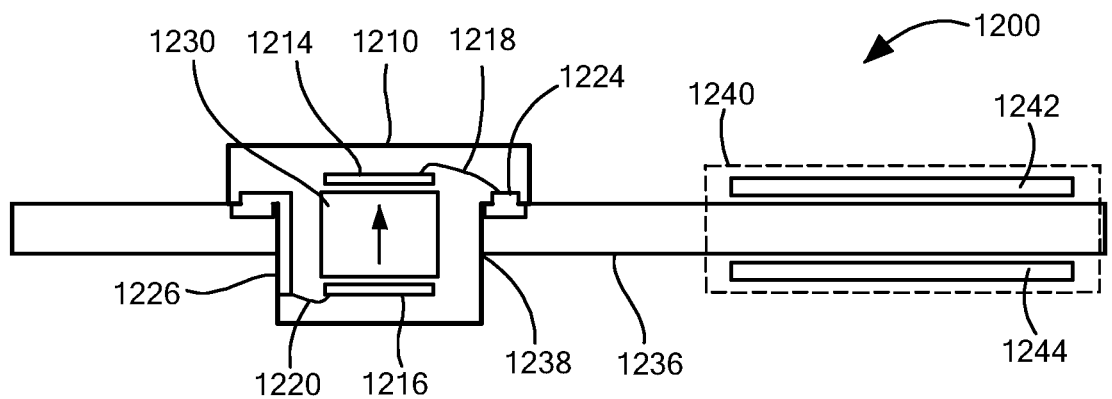
FIG. 12 shows a heterogeneous sensor incorporating magnetic field sensing and inductive sensing that is suitable for a torque sensing application.

Referring also to FIG. 12, an alternative torque sensing system 1200 includes a heterogeneous sensor 1210 incorporating magnetic field sensing and inductive sensing. The sensor 1210 can be mounted in an aperture 1238 of a PCB 1236. The PCB 1236 can be mounted to a stationary sleeve coupled to rotatable shafts (not shown in FIG. 12 for simplicity, but which shafts can be the same as or similar to shafts 1110, 1114 of FIG. 11 that are coupled to respective rotatable targets 1116, 1118).

Like sensor 1120 of FIG. 11, sensor 1210 can include a first magnetic field sensor 1214 to be positioned proximate to a first target (e.g., target 1116) and that is configured to generate a first magnetic field output signal indicative of an angle of the first target and a second magnetic field sensor 1216 to be positioned proximate to a second target (e.g., target 1118) and that is configured to generate a second magnetic field output signal indicative of an angle of the second target. Magnetic field sensors 1214, 1216 can be the same as or similar to magnetic field sensor 20 of FIG. 1.

Magnetic field sensors 1214, 1216 share a back bias magnet 1230 that is positioned between the first and second magnetic field sensors and configured to generate a magnetic field that is affected by rotation of proximate targets. In implementations, each magnetic field sensor 1214, 1216 is supported by a respective semiconductor die that is mounted to an opposite surface of the back bias magnet 1230.

Heterogeneous sensing system 1200 further includes inductive sensors as may be incorporated into an inductive sensor unit 1240. A first inductive sensor 1242 can be positioned to face the first target (e.g., target 1116) and a second inductive sensor 1244 can be positioned to face the second target (e.g., target 1118). Inductive sensors 1242, 1244 can be the same as or similar to inductive sensor 40 of FIG. 1. The inductive sensor interface circuitry can be provided in the inductive sensor unit 1240 proximate to the respective primary and secondary coils or elsewhere.

In order to meet certain safety requirements, a checker circuit, as may be part of the sensor 1200 or external to the sensor, can be provided to compare an indication of the first target angle from the first magnetic field sensor 1214 to an indication of the first target angle from the first inductive sensor 1242 and also to compare an indication of the second target angle from the second magnetic field sensor 1216 to an indication of the second target angle from the second inductive sensor 1244. An error can be determined to have occurred if the comparison reveals greater than a predetermined deviation in the angle measurements from the magnetic field sensors 1214, 1216 and the inductive sensors 1242, 1244, respectively.

A processing unit, as may be part of the sensor 1200 or external to the sensor, can be configured to determine a difference between the angle of the first target (e.g., target 1116) and the angle of the second target (e.g., target 1118) based on output signals of the magnetic field sensors 1214, 1216 and/or output signals of the inductive sensors 1242, 1244. A torque applied to a first shaft (e.g., shaft 1110) and/or to a second shaft (e.g., shaft 1114) can be calculated based on the angle difference.

The sensor package 1210 can be electrically coupled to the PCB 1236 by wire bonds 1218, 1220. For example, the first magnetic field sensor 1214 can be electrically coupled to PCB 1236 by one or more wire bonds 1218 coupled to one or more PCB bond pads 1224 and the second magnetic field sensor 1216 can be electrically coupled to PCB 1236 by one or more wire bonds 1220 coupled to one or more PCB bond pads 1226.

It will be appreciated that while the heterogeneous system 1200 includes a shared back bias magnet 1230 for both magnetic sensors 1214, 1216, in some implementations, the proximate targets (e.g., targets 1116, 1118) can be of a type to include portions optimized for magnetic sensing and for inductive sensing. For example, in embodiments, targets proximate to the sensors can be of the type shown in FIGS. 8 and 9, in which the back bias magnet 1230 can be eliminated. In such embodiments, it may be advantageous to provide a ferromagnetic shield between the sensors 1214, 1216.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. An angle sensor system configured to sense an angle of a target that is rotatable about an axis of rotation, comprising:
 a magnetic field sensor, comprising a magnetic field sensing element responsive to a magnetic field affected by movement of the target, and configured to generate a magnetic field sensor output signal indicative of an angle of the target;
 an inductive sensor comprising:
  an oscillator configured to generate an oscillation signal;
  a primary coil coupled to receive the oscillation signal; and
  one or more secondary coils electromagnetically coupled to the primary coil as a function of the angle of the target, wherein the inductive sensor is configured to generate an inductive sensor output signal indicative of the angle of the target; and
 a checker configured to receive the magnetic field sensor output signal and the inductive sensor output signal and determine whether an error has occurred based on a comparison of the magnetic field sensor output signal and the inductive sensor output signal,
 wherein the target comprises a conductive ferromagnetic material and has an outer radius, an intermediate radius, and an inner radius, and wherein the target further has a first plurality of features extending from the outer radius to the intermediate radius and a second plurality of features extending from the intermediate radius to the inner radius, wherein the first plurality of features comprises a different number of features than the second plurality of features, and wherein the first plurality of features and the second plurality of features are positioned in a target plane that is orthogonal with respect to the axis of rotation,
 wherein magnetic field sensor comprises a first magnetic field sensor adjacent to the first plurality of features and comprising a first back bias magnet and a second magnetic field sensor adjacent to the second plurality of features and comprising a second back magnet, and wherein the inductive sensor comprises a first inductive sensor adjacent to the first plurality of features and a second inductive sensor adjacent to the second plurality of features, wherein the magnetic field sensor and the inductive sensor are positioned in a sensing plane that is substantially parallel with respect to the target plane.

2. The angle sensor system of claim 1, wherein the first magnetic field sensor and the first inductive sensor are positioned adjacent to each other in a circumferential direction with respect to the target axis of rotation and wherein the second magnetic field sensor and the second inductive sensor positioned adjacent to each other in a circumferential direction with respect to the target axis of rotation.

3. The angle sensor system of claim 2, further comprising an interface IC configured to support circuitry to generate the inductive sensor output signal and further comprising a printed circuit board configured to support the magnetic field sensor, the inductive sensor, and the interface IC.

4. An angle sensor system configured to sense an angle of a target that is rotatable about an axis of rotation, comprising:
  a conductive ferromagnetic target having an outer radius, an intermediate radius, and an inner radius, and wherein the target further has a first plurality of features extending from the outer radius to the intermediate radius and a second plurality of features extending from the intermediate radius to the inner radius, wherein the first plurality of features comprises a different number of features than the second plurality of features, and wherein the first plurality of features and the second plurality of features are positioned in a target plane that is orthogonal with respect to the axis of rotation;
  a first magnetic field sensor adjacent to the first plurality of features and comprising a first back bias magnet;
  a second magnetic field sensor adjacent to the second plurality of features and comprising a second back bias magnet;
  a first inductive sensor adjacent to the first plurality of features; and
  a second inductive sensor adjacent to the second plurality of features, wherein the first and second magnetic field sensors and the first and second inductive sensors are positioned in a sensing plane that is substantially parallel with respect to the target plane.

5. The angle sensor system of claim 4, wherein each of the first plurality of features and second plurality of features comprises an aperture in the target.

6. The angle sensor system of claim 4, wherein the first magnetic field sensor and the first inductive sensor are positioned adjacent to each other in a circumferential direction with respect to the target axis of rotation and wherein the second magnetic field sensor and the second inductive sensor are positioned adjacent to each other in a circumferential direction with respect to the target axis of rotation.

* * * * *

UNITED STATES PATENT AND TRADEMARK OFFICE
CERTIFICATE OF CORRECTION

PATENT NO. : 12,203,822 B2
APPLICATION NO. : 17/659224
DATED : January 21, 2025
INVENTOR(S) : Emanuele Andrea Casu et al.

It is certified that error appears in the above-identified patent and that said Letters Patent is hereby corrected as shown below:

In the Specification

Column 8, Line 67, delete "(I2C)" and replace with --($I^2C$)--.

Column 9, Line 66, delete "(I2C)" and replace with --($I^2C$)--.

Column 13, Line 45, delete "magnetic sensors" and replace with --magnetic field sensors--.

In the Claims

Column 23, Line 1, Claim 1, delete "back magnet" and replace with --back bias magnet--.

Column 23, Line 13, Claim 2, delete "sensor positioned" and replace with --sensor are positioned--.

Signed and Sealed this
Twenty-second Day of July, 2025

Coke Morgan Stewart
*Acting Director of the United States Patent and Trademark Office*